US010985505B2

(12) United States Patent
Hirakawa

(10) Patent No.: US 10,985,505 B2
(45) Date of Patent: Apr. 20, 2021

(54) CONNECTOR WITH EXPOSED CONDUCTIVE CONTACT

(71) Applicant: I-PEX Inc., Kyoto (JP)

(72) Inventor: Takeshi Hirakawa, Machida (JP)

(*) Notice: Subject to any disclaimer, the term of this patent is extended or adjusted under 35 U.S.C. 154(b) by 0 days.

(21) Appl. No.: 16/610,914

(22) PCT Filed: Apr. 11, 2018

(86) PCT No.: PCT/JP2018/015270
§ 371 (c)(1),
(2) Date: Nov. 5, 2019

(87) PCT Pub. No.: WO2018/207541
PCT Pub. Date: Nov. 15, 2018

(65) Prior Publication Data
US 2020/0161813 A1 May 21, 2020

(30) Foreign Application Priority Data
May 10, 2017 (JP) .............................. JP2017-094011

(51) Int. Cl.
H01R 13/648 (2006.01)
H01R 13/6591 (2011.01)
(Continued)

(52) U.S. Cl.
CPC ......... H01R 13/6591 (2013.01); H01R 12/55 (2013.01); H01R 13/50 (2013.01); H01R 13/6585 (2013.01)

(58) Field of Classification Search
CPC .... H01R 13/6591; H01R 12/55; H01R 13/50; H01R 13/6585; H01R 24/60; H01R 12/722; F21L 4/00; G06F 3/03
(Continued)

(56) References Cited

U.S. PATENT DOCUMENTS 4,824,383 A 4/1989 Lemke
6,190,202 B1 2/2001 Lai
(Continued)

FOREIGN PATENT DOCUMENTS

CN 1781347 5/2006
CN 201522692 7/2010
(Continued)

OTHER PUBLICATIONS

International Search Report dated Jul. 10, 2018 for PCT/JP2018/015270.
(Continued)

Primary Examiner — Abdullah A Riyami
Assistant Examiner — Nelson R. Burgos-Guntin
(74) Attorney, Agent, or Firm — Soei Patent & Law Firm

(57) ABSTRACT

A connector is provided with a connector main body having conductive contacts and a housing holding the conductive contacts. The conductive contacts are exposed from the housing so as to be electrically connectable to a mating connector in a distal end portion of the connector main body and are exposed from the housing so as to be electrically connectable to a substrate in a rear end portion of the connector main body. The housing has positioning portions positioning the connector main body and the substrate relative to each other. The positioning portions are located closer to a center line of the connector main body than the conductive contacts when the connector main body is viewed in plan. The center line extends along a direction from the distal end portion of the connector main body toward the rear end portion.

20 Claims, 19 Drawing Sheets

(51) Int. Cl.
*H01R 12/55* (2011.01)
*H01R 13/50* (2006.01)
*H01R 13/6585* (2011.01)

(58) Field of Classification Search
USPC .................................................. 439/607.09
See application file for complete search history.

(56) References Cited

U.S. PATENT DOCUMENTS

| | | | |
|---|---|---|---|
| 7,094,103 | B2 | 8/2006 | Lai |
| 7,175,465 | B1 | 2/2007 | Tsai |
| 7,422,475 | B2 | 9/2008 | Hirata |
| 8,366,485 | B2 | 2/2013 | Johnescu et al. |
| 9,214,766 | B1 | 12/2015 | Yu et al. |
| 9,300,091 | B2 | 3/2016 | Katayanagi |
| 9,401,573 | B1* | 7/2016 | Fernandez ......... H01R 13/6593 |
| 9,666,996 | B2 | 5/2017 | Hsu |
| 9,685,718 | B1* | 6/2017 | Wang .................. H01R 12/716 |
| 9,755,353 | B2 | 9/2017 | Tsai et al. |
| 9,905,944 | B2* | 2/2018 | Little ................. H01R 13/6658 |
| 9,997,869 | B2 | 6/2018 | Zhang |
| 10,205,290 | B2 | 2/2019 | Tsai |
| 2003/0207600 | A1 | 11/2003 | Ho |
| 2005/0215109 | A1 | 9/2005 | Satou |
| 2006/0286858 | A1 | 12/2006 | Uchida et al. |
| 2012/0206360 | A1 | 8/2012 | Tuan et al. |
| 2013/0090005 | A1* | 4/2013 | Nesme .................. H04Q 1/142 |
| | | | 439/391 |
| 2013/0330976 | A1 | 12/2013 | Simmel et al. |
| 2014/0073190 | A1 | 3/2014 | Zhao et al. |
| 2015/0270659 | A1* | 9/2015 | Kao ....................... H01R 24/64 |
| | | | 439/607.01 |
| 2015/0303623 | A1* | 10/2015 | Kao ....................... H01R 24/60 |
| | | | 439/607.04 |
| 2016/0013599 | A1 | 1/2016 | Ueda et al. |
| 2016/0141804 | A1* | 5/2016 | Kao .................. H01R 13/6582 |
| | | | 439/607.01 |
| 2016/0156136 | A1 | 6/2016 | Kao et al. |
| 2016/0172791 | A1* | 6/2016 | Fan .................... H01R 13/6593 |
| | | | 439/607.05 |
| 2016/0329660 | A1* | 11/2016 | Xing ....................... H01R 43/20 |
| 2016/0344122 | A1 | 11/2016 | Kao et al. |
| 2017/0040747 | A1 | 2/2017 | Hayashi et al. |
| 2017/0054256 | A1 | 2/2017 | Yokoyama et al. |
| 2017/0110821 | A1 | 4/2017 | Oyake |
| 2017/0110837 | A1* | 4/2017 | Taniguchi .......... H01R 13/7137 |
| 2017/0201048 | A1* | 7/2017 | Kong ................... H01R 13/631 |
| 2017/0310056 | A1* | 10/2017 | Yuan .................. H01R 13/6585 |
| 2017/0338602 | A1 | 11/2017 | Ho |
| 2018/0109042 | A1* | 4/2018 | Little ................... H01R 13/405 |
| 2018/0181222 | A1 | 6/2018 | Ivanov |
| 2018/0331468 | A1* | 11/2018 | Little ................... H01R 12/724 |
| 2019/0123470 | A1* | 4/2019 | Li ......................... H01R 13/405 |
| 2019/0131748 | A1* | 5/2019 | Cheng ................ H01R 13/6597 |
| 2020/0161812 | A1* | 5/2020 | Hirakawa ................. F21L 4/00 |
| 2020/0161813 | A1* | 5/2020 | Hirakawa .............. H01R 24/60 |

FOREIGN PATENT DOCUMENTS

| | | |
|---|---|---|
| CN | 203521701 | 4/2014 |
| CN | 204179381 | 2/2015 |
| CN | 104466511 | 3/2015 |
| CN | 103779697 | 7/2016 |
| JP | S60-080685 | 6/1985 |
| JP | H3-501185 | 3/1991 |
| JP | H6-054230 | 7/1994 |
| JP | 3070359 | 7/2000 |
| JP | 2003-331958 | 11/2003 |
| JP | 2006-260345 | 9/2006 |
| JP | 2015-228345 | 12/2015 |
| JP | 2016-018674 | 2/2016 |
| JP | 5913759 | 4/2016 |
| JP | 2017-37726 | 2/2017 |
| TW | 200536192 | 11/2005 |
| TW | 201547124 | 12/2015 |

OTHER PUBLICATIONS

International Preliminary Report on Patentability with Written Opinion dated Nov. 12, 2019 for PCT/JP2018/015270.
International Search Report dated May 29, 2018 for PCT/JP2018/015269.
International Preliminary Report on Patentability with Written Opinion dated Nov. 12, 2019 for PCT/JP2018/015269.
SOEI Patent and Law Firm, Statement of Related Matters, dated Jan. 27, 2020.

* cited by examiner

CONNECTOR WITH EXPOSED CONDUCTIVE CONTACT

CROSS-REFERENCE TO RELATED APPLICATIONS

This application is a 35 U.S.C. § 371 national phase application of PCT/JP2018/015270, filed on Apr. 11, 2018, which claims priority to Japanese Patent Application No. P2017-094011, filed on May 10, 2017.

TECHNICAL FIELD

The present disclosure relates to a connector.

BACKGROUND ART

A connector may be connected to a substrate in the rear end portion that is opposite to the distal end portion which is connected to a mating connector. Patent Literature 1 discloses a connector that can be fitted to a mating connector along a front-rear direction and is provided with a holding member, a contact, a shell, and a ground member. This connector has a pair of groove portions into which a relay board is inserted in both rear side portions of the holding member. The relay board is fixed to the connector by being inserted into the groove portion.

The connector is applied to various devices, equipment, and so on. For example, a pen-type electronic device as disclosed in Patent Literature 2 is known as an electronic device to which the connector is applied. Known as pen-type electronic devices are various devices such as a penlight, a laser pointer, a pen-type recorder, a pen-type demagnetizer, a pen-type hardness tester, a pen-type humidifier, and an electronic pen. The connector is provided in the electronic devices or devices electrically connected to the electronic devices for the purpose of charging of a built-in battery, communication with a computer device, or the like.

CITATION LIST

Patent Literature

Patent Literature 1: Japanese Unexamined Patent Publication No. 2015-228345
Patent Literature 2: Japanese Unexamined Patent Publication No. 2006-260345

SUMMARY OF INVENTION

Technical Problem

There is a tendency toward size reduction regarding various devices and equipment including electronic devices. In addition, connector size reduction for design improvement is considered desirable in fields where size reduction is not required. For example, size reduction-based design and portability improvement is conceivable also in the field of the pen-type electronic device disclosed in Patent Literature 2.

In general, a means for positioning a substrate is required when a substrate is attached to a connector, for example in Patent Literature 1. In this regard, in Patent Literature 1, the relay board is positioned by the groove portions formed in both side portions of the holding member with the contact sandwiched. However, the connector increases in size when the groove portion functioning as positioning means as described above is formed outside the contact.

An object of the present disclosure is to provide a connector that can be reduced in size.

Solution to Problem

Provided in an aspect of the present disclosure is a connector comprising a connector main body comprising a conductive contact and a housing holding the conductive contact. The conductive contact is exposed from the housing so as to be electrically connectable to a mating connector at a distal end portion of the connector main body, and is exposed from the housing so as to be electrically connectable to a substrate at a rear end portion of the connector main body. The housing comprises a positioning portion positioning the connector main body and the substrate relative to each other. The positioning portion is located closer to a center line of the connector main body than at least one of the conductive contact when the connector main body is viewed in plan. The center line extends along a direction from the distal end portion of the connector main body toward the rear end portion.

The connector has the positioning portion positioning the connector main body and the substrate relative to each other. The positioning portion is located closer to the center line of the connector main body, which extends along the direction from the distal end portion toward the rear end portion, than at least one of the conductive contacts. Such a connector can be reduced in size as compared with a connector in which the positioning portion is provided farther from the center line than every conductive contact.

The connector main body may comprise a plate-shaped conductor which is different from the conductive contact and the housing may hold the conductive contact and the plate-shaped conductor so as to remain insulated from each other. The plate-shaped conductor is capable of functioning as a part of a ground (earth) circuit.

The positioning portion may comprise a projection protruding in the direction beyond the conductive contact and the plate-shaped conductor. In this manner, it is possible to suppress, for example, deformation attributable to contact of the substrate with the conductive contact and the plate-shaped conductor in positioning the substrate and the housing relative to each other.

The positioning portion may position the substrate by causing a notch portion of the substrate and a groove portion of the projection to be engaged with each other. In this manner, the accuracy of the positioning can be improved. In addition, the conductive contacts may be located along a surface and a back surface of the plate-shaped conductor. In this case, signal interference between the conductive contacts located along the surface and the back surface, so-called crosstalk, can be suppressed insofar as the connector main body has the plate-shaped conductor. Application to a highly versatile connector such as a USB Type C connector is also possible by the connector main body being configured as described above. However, the type of the connector is not limited thereto.

The connector may further comprise a shell comprising a through hole configured such that the mating connector is insertable. In this case, an end portion of the plate-shaped conductor exposed from the side portion of the housing may be fixed to an inner wall of the shell forming the through hole such that a distal end portion of the conductive contact is located in the through hole. The connector can be further reduced in size by the end portion of the plate-shaped conductor held by the housing being fixed to the inner wall of the shell as described above.

The plate-shaped conductor may comprise an elastic portion urging the end portion toward the inner wall of the shell forming the through hole. In this manner, the plate-shaped conductor is satisfactorily fixed to the inner wall of the shell and the reliability of the connector can be improved.

A step portion engageable with the end portion of the plate-shaped conductor may be formed on the inner wall of the shell. The end portion of the plate-shaped conductor may be fixed to the inner wall of the shell by abutting against the step portion. In this manner, the plate-shaped conductor is more firmly fixed to the inner wall of the shell and the reliability of the connector can be further improved.

The shell may be made of metal and may comprise an abutting surface against which a distal end of the mating connector abuts, when the mating connector is connected to the distal end portion of the connector main body. By such an abutting surface being provided, the mating connector abuts against the metallic abutting surface when the mating connector is connected to the connector. In this manner, it is possible to suppress connector breakage attributable to an excessive insertion force during mating connector connection and the connection reliability of the connector can be improved. In addition, the metallic shell has high mechanical strength, and thus the connector can be further reduced in size.

In addition, the end portion of the plate-shaped conductor is fixed to the inner wall of the metallic shell, and thus the shell is capable of functioning as a part of a ground (earth) circuit as well. Accordingly, it is possible to suppress static electricity generation, protect the internal circuit of an electronic device, and improve the reliability of the electronic device.

The connector may be attached to a pen-type electronic device such that the shell forms the exterior of the pen-type electronic device. In this case, the conductive contact may comprise a connection portion electrically connected to the substrate incorporated into the pen-type electronic device. Such a connector can be reduced in size, and thus can be suitably used as a connector for pen-type electronic devices. In this case, a process for manufacturing the pen-type electronic device can be simplified insofar as the connector and the substrate have an integrated structure.

The connector may further include the substrate positioned by the positioning portion. The substrate has a terminal electrically connected to the conductive contact. Such a connector has an integrated structure with the substrate, and thus methods for manufacturing electronic devices provided with the connector can be simplified.

Advantageous Effects of Invention

Provided is a connector that can be reduced in size.

DESCRIPTION OF EMBODIMENTS

Figure 1:
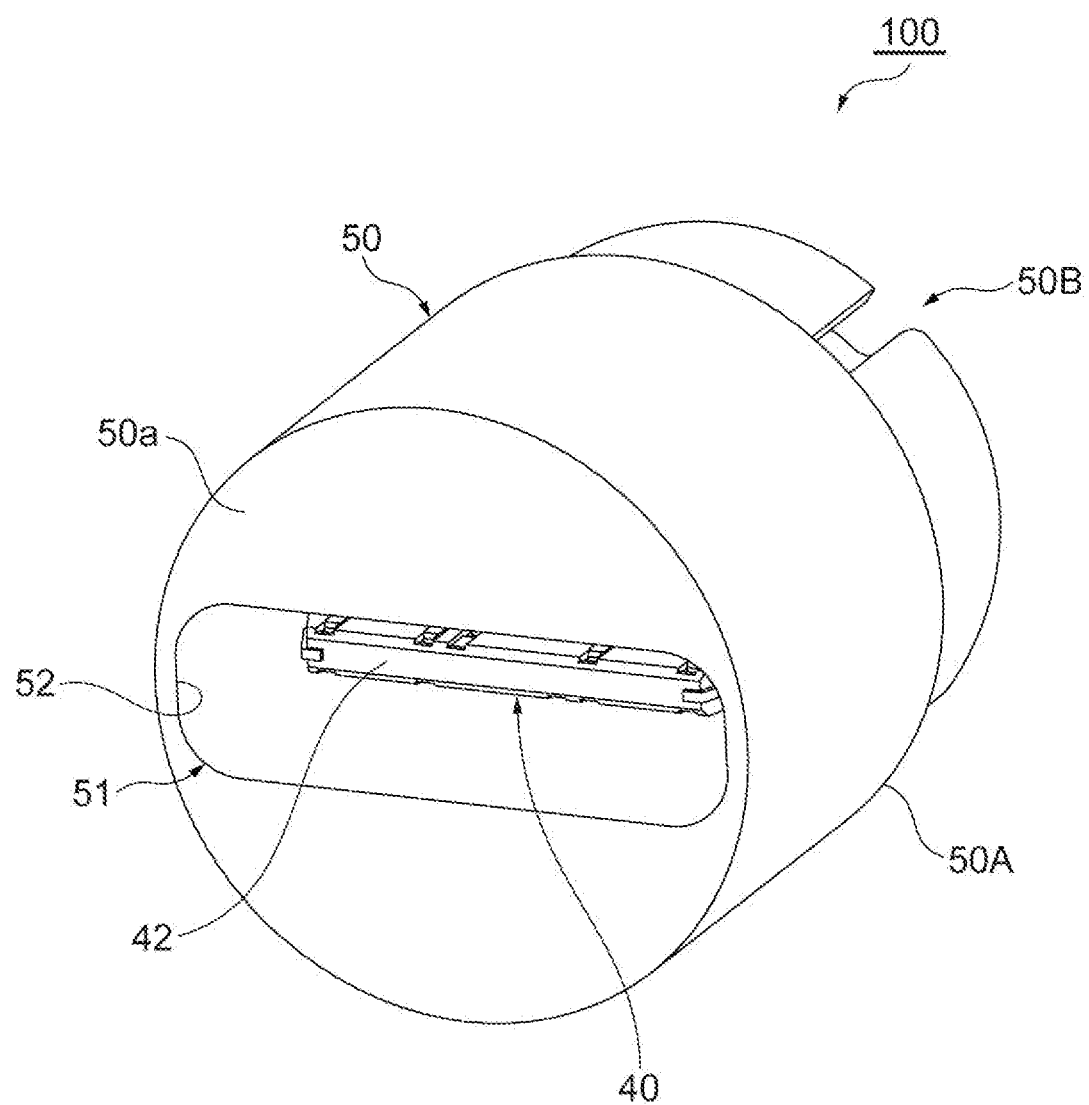
FIG. 1 is a perspective view of a connector according to an embodiment.

Hereinafter, embodiments will be described with reference to the drawings as the case may be. However, the following embodiments are examples and are not intended to limit the present invention to the following content. In the description, the same reference numerals will be used for the same elements or elements having the same functions and redundant descriptions will be omitted if the omission is necessary. Unless otherwise specified, positional relationships such as up, down, left, and right are based on the positional relationships illustrated in the drawings. The dimensional ratios of each element are not limited to the illustrated ratios.

In several embodiments, the connector of the present disclosure is provided with a connector main body having at least one or more conductive contacts (hereinafter, referred to as the conductive contact) and a housing holding the conductive contact. In a case where the housing holds a plurality of the conductive contacts, the conductive contacts are held by the housing so as to remain insulated from each other. The conductive contacts are exposed from the housing so as to be electrically connectable to a mating connector in a distal end portion of the connector main body and are exposed from the housing so as to be electrically connectable to a substrate in a rear end portion of the connector main body.

The connector may be provided with a plate-shaped conductor. The conductive contact and the plate-shaped conductor are held by the housing so as to remain insulated from each other. A conductor such as a copper alloy forms the conductive contact and the plate-shaped conductor. The conductive contact extends between the distal and rear end portions of the connector main body. When the connector is attached to an electronic device, the conductive contact functions as a conductive contact for signal transmission, electric power supply, ground, or the like. The conductive contact may form a part of an electric circuit different from the plate-shaped conductor in the electronic device. The plate-shaped conductor may form a part of a ground circuit or the like in the electronic device. The plate-shaped conductor may have a plate-shaped main portion. The plate-shaped conductor may have a member (such as a tongue-shaped portion) extending from the plate-shaped main portion.

An insulating cured resin or the like forms the housing. The housing has a positioning portion positioning the connector main body and the substrate relative to each other. When the connector main body is viewed in plan, the positioning portion is located closer to a center line of the connector main body than at least one of the conductive contacts. The center line extends along a direction from the distal end portion of the connector main body toward the rear end portion of the connector main body. In other words, in the plan view, the positioning portion is located closer to the center line than at least one of the conductive contacts. For example, in the plan view, the conductive contacts may be held in the housing in pairs so as to sandwich the center line and the positioning portion may be provided between at least one of the pairs of conductive contacts.

In several examples, the connector may be provided with the connector main body and a metallic shell having a through hole configured such that a mating connector is insertable. In this case, the end portion of the plate-shaped conductor that is exposed from the side portion of the housing may be fixed to the inner wall of the shell forming the through hole such that the distal end portion of the connector main body that is electrically connected to the mating connector is located in the through hole. The shell may be, for example, a metal containing at least one selected from copper, aluminum, nickel, tin, and cobalt or may be an alloy containing these metals. For example, the shell may be alloy steel such as stainless steel. The shell may be a casing of an electronic device or the like. In this manner, the connector incorporated into electronic devices or the like can be further reduced in size.

The connector described above may be used for a pen-type electronic device. In this case, the shell may form the exterior of the pen-type electronic device. Examples of the pen-type electronic device include a penlight, a laser pointer, a pen-type recorder, a pen-type demagnetizer, a pen-type hardness tester, a pen-type humidifier, and an electronic pen. However, the pen-type electronic device is not limited thereto. The connector is provided with the metallic shell, and thus is superior in mechanical strength to resinous connectors. Accordingly, it is possible to reduce the outer diameter of the connector without impairing the mechanical strength of the connector. Accordingly, the connector can be suitably used for various substantially pen-shaped electronic devices other than those described above.

In a case where the connector is connected to a mating connector, the connector may be a so-called female connector (receptacle connector) and coupled to the mating connector that is a male connector (plug connector). The type of the connector is not particularly limited. For example, the connector may be a receptacle connector conforming to the Universal Serial Bus (USB) Type-C standard.

Although a connector required to be reduced in size and provided for a pen-shaped electronic device will be described in the embodiments described below, the connector of the present disclosure can be used for various devices, equipment, and so on without being limited to a connector for pen-shaped electronic devices.

FIG. 1 is a perspective view of a connector 100 according to an embodiment. The connector 100 is provided with a metallic casing 50 having a through hole 51 into which a mating connector is inserted and a connector main body 40 fixed to an inner wall 52 of the casing 50 forming the through hole 51 such that a distal end portion 42 is located in the through hole 51. The casing 50 (shell 50) has a main body portion 50A having a substantially columnar outer shape and a connecting portion 50B for attaching the connector 100 to the pen main body portion of a pen-type electronic device. In the description of the present disclosure, a surface 50a side of the main body portion 50A, which is in front of the connecting portion 50B, will be referred to as the front surface side of the connector 100 and the connecting portion side will be referred to as the rear surface side of the connector 100 with the distal end portion 42 of the connector main body 40 in FIG. 1 viewed from the front surface such that the connecting portion 50B is at the rear.

Figure 2:
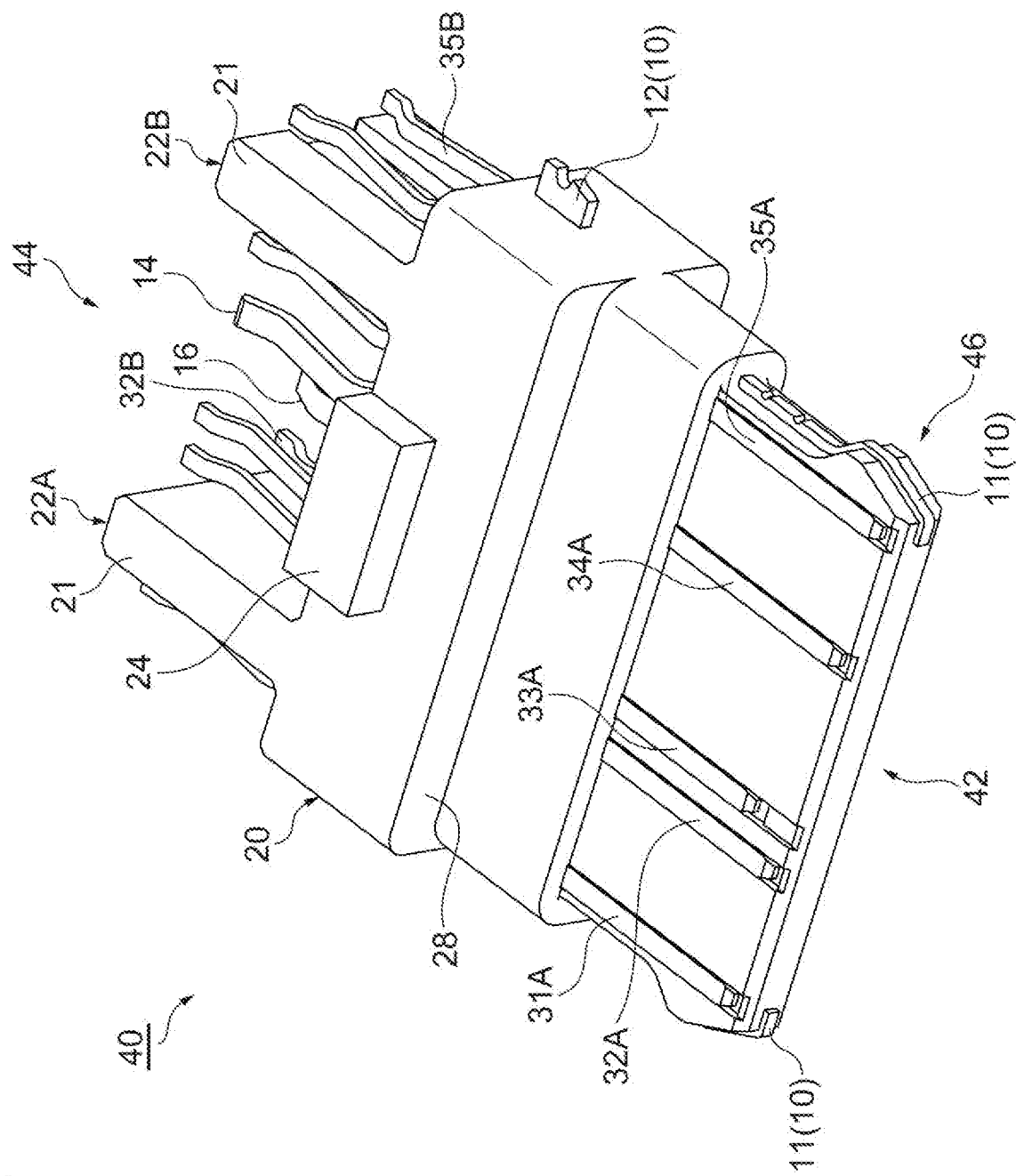
FIG. 2 is a perspective view in which a connector main body provided in the connector according to an embodiment is viewed from a front surface side.

FIG. 2 is a perspective view in which the connector main body 40 is viewed from the front surface side. The connector main body 40 is provided with a plate-shaped conductor 10 having a main body portion embedded in a housing 20, conductive contacts 31A, 32A, 33A, 34A, and 35A (hereinafter, collectively referred to as "31A to 35A"), and the housing 20 holding the plate-shaped conductor 10 and the conductive contacts 31A to 35A so as to remain insulated from each other. The conductive contacts 31A to 35A function as conductive contacts for signal transmission, electric power supply, ground, or the like when the connector 100 is attached to the pen-type electronic device.

The conductive contacts 31A to 35A are exposed in the distal end portion 42 of the connector main body 40 so as to be capable of being in contact with conductive contacts of the mating connector when the connector 100 is connected to the mating connector. In addition, the conductive contacts 31A to 35A are exposed in a rear end portion 44 of the connector main body 40 so as to be capable of being in contact with terminals provided on a substrate 70 (see FIGS. 15 and 16) attached to the rear end portion 44 located on the rear surface side of the connector main body 40. In this manner, the conductive contacts 31A to 35A extend between the distal end portion 42 and the rear end portion 44. The middle portions of the conductive contacts 31A to 35A are held so as to remain insulated from the casing 50 as well by being embedded in the cured resin that forms the housing 20.

The housing 20 has a projecting portion 24 protruding upward in FIG. 2. When the connector main body 40 is fixed to the casing 50, the projecting portion 24 regulates the depth of insertion of the connector main body 40 into the through hole 51 by abutting against a recess 55 (see FIG. 8) formed in the through hole 51 of the casing 50. In this manner, the projecting portion 24 functions as a fixing portion of the connector main body 40 with respect to the casing 50 together with an end portion 12 of the plate-shaped conductor 10. However, the projecting portion 24 is optional and simply the pair of end portions 12 at both ends of the connector main body 40 may function as fixing portions of the connector main body 40 with respect to the casing 50.

Figure 3:
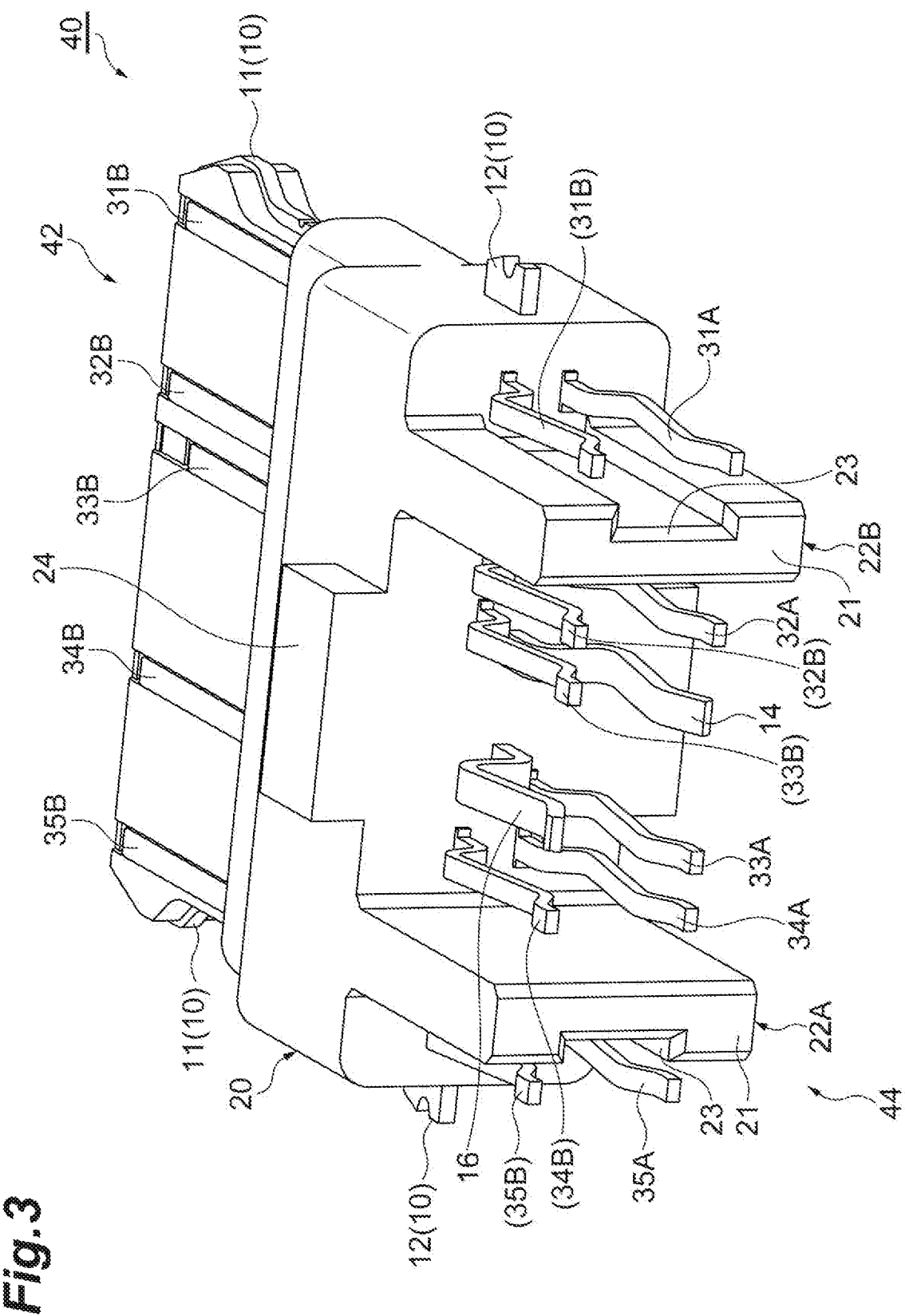
FIG. 3 is a perspective view in which the connector main body provided in the connector according to an embodiment is viewed from a rear surface side.

FIG. 3 is a perspective view in which the connector main body 40 is viewed from the rear surface side. The back surface of the connector main body 40 is illustrated in FIG.

Figure 5:
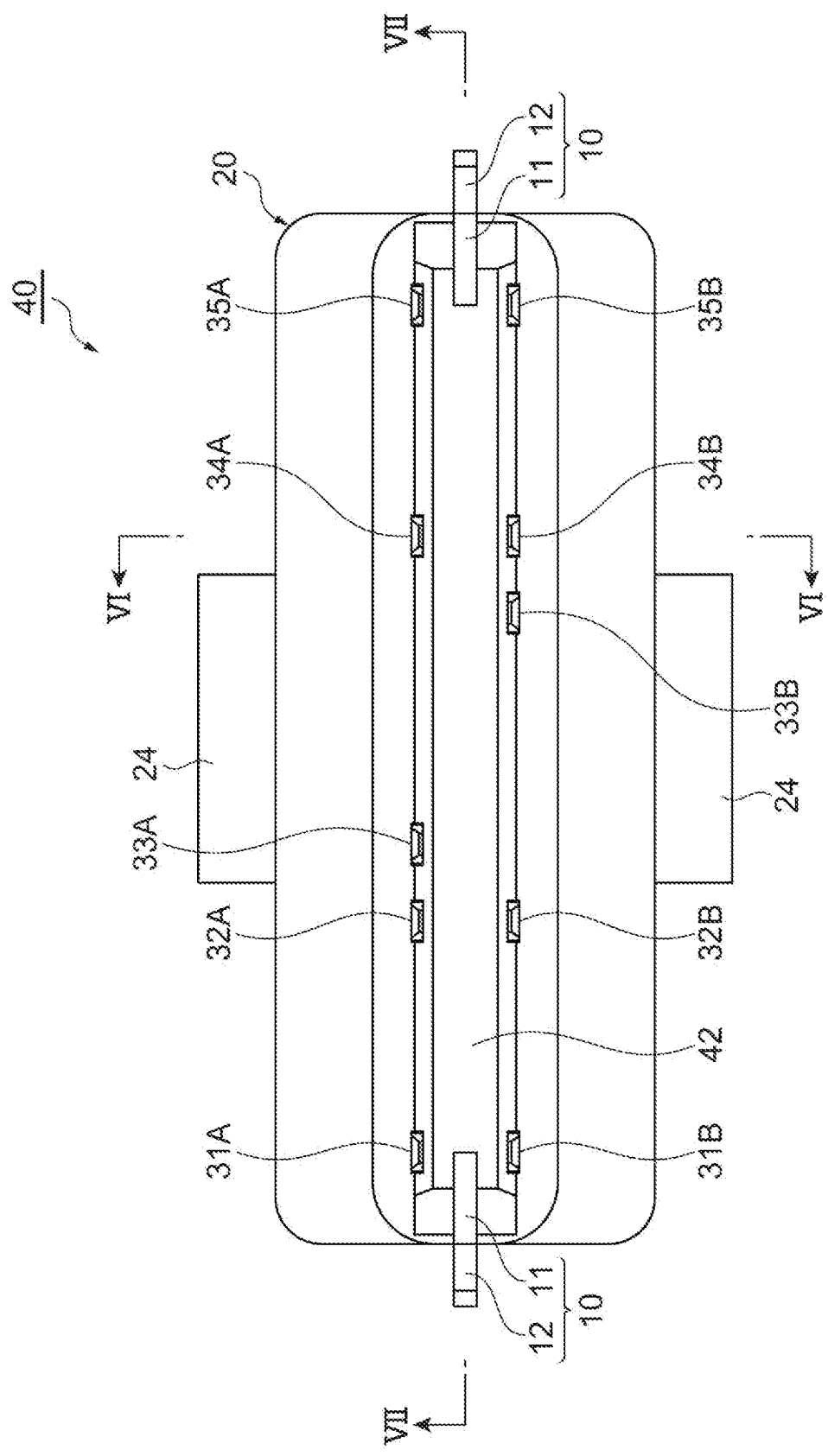
FIG. 5 is a front view of the connector main body provided in the connector according to an embodiment.

3 whereas the surface of the connector main body 40 is illustrated in FIG. 2. As illustrated in FIG. 3, also on the back surface of the connector main body 40, conductive contacts 31B, 32B, 33B, 34B, and 35B (hereinafter, collectively referred to as "31B to 35B") extend between the distal end portion 42 and the rear end portion 44 similarly to the conductive contacts 31A to 35A provided on the surface. As illustrated in FIG. 5, the conductive contacts 31A, 32A, 34A, and 35A illustrated in FIG. 2 and the conductive contacts 31B, 32B, 34B, and 35B illustrated in FIG. 3 are located so as to face each other via the plate-shaped conductor 10, respectively.

Figure 6:
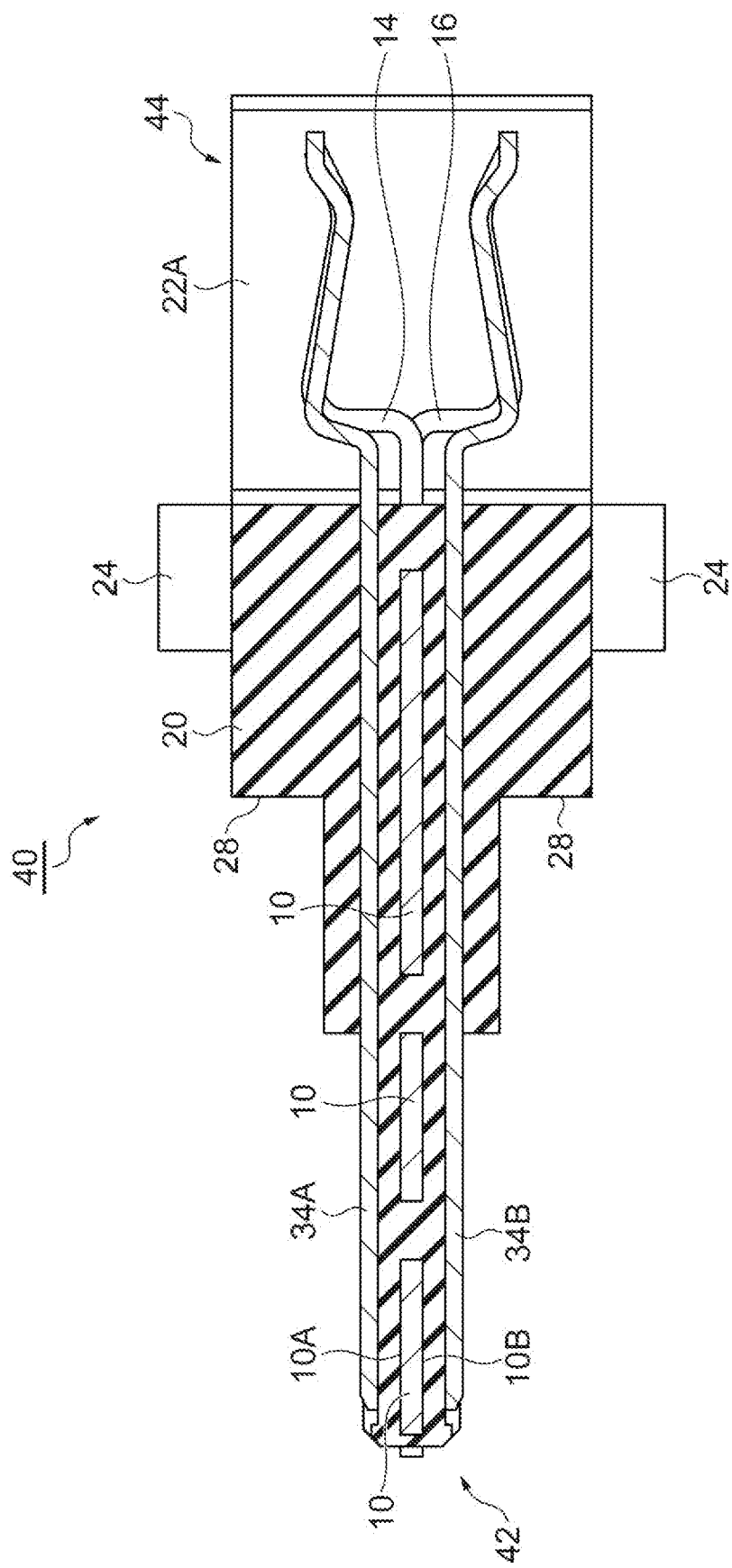
FIG. 6 is a cross-sectional view of the connector main body taken along line VI-VI in FIG. 5.

As illustrated in FIG. 6, the conductive contacts 31A to 35A and the conductive contacts 31B to 35B are curved in the rear end portion 44. Specifically, the conductive contacts 31A to 35A and the conductive contacts 31B to 35B are curved such that the gap between the conductive contacts located so as to face each other is larger in the rear end portion 44 than in the distal end portion 42 of the connector main body 40. In the rear end portion 44, a substrate is attached between the conductive contacts 31A to 35A and the conductive contacts 31B to 35B. Incidentally, the shape of each conductive contact is not limited thereto. The gap between the conductive contacts located so as to face each other may be constant or may be smaller in the rear end portion 44 than in the distal end portion 42 of the connector main body 40.

As illustrated in FIGS. 2 and 3, the end portions 12 of the plate-shaped conductor 10 are respectively exposed from the housing 20 in both side portions of the connector main body 40. In addition, a side edge portion 11 of the plate-shaped conductor 10 is exposed in the distal end portion 42 of the connector main body 40 and an end portion 46 on the front surface side continuous from the distal end portion 42. Further, the plate-shaped conductor 10 has tongue-shaped portions 14 and 16 exposed in the rear end portion 44 of the connector main body 40. The other parts of the plate-shaped conductor 10 are embedded in the housing 20.

Figure 11:
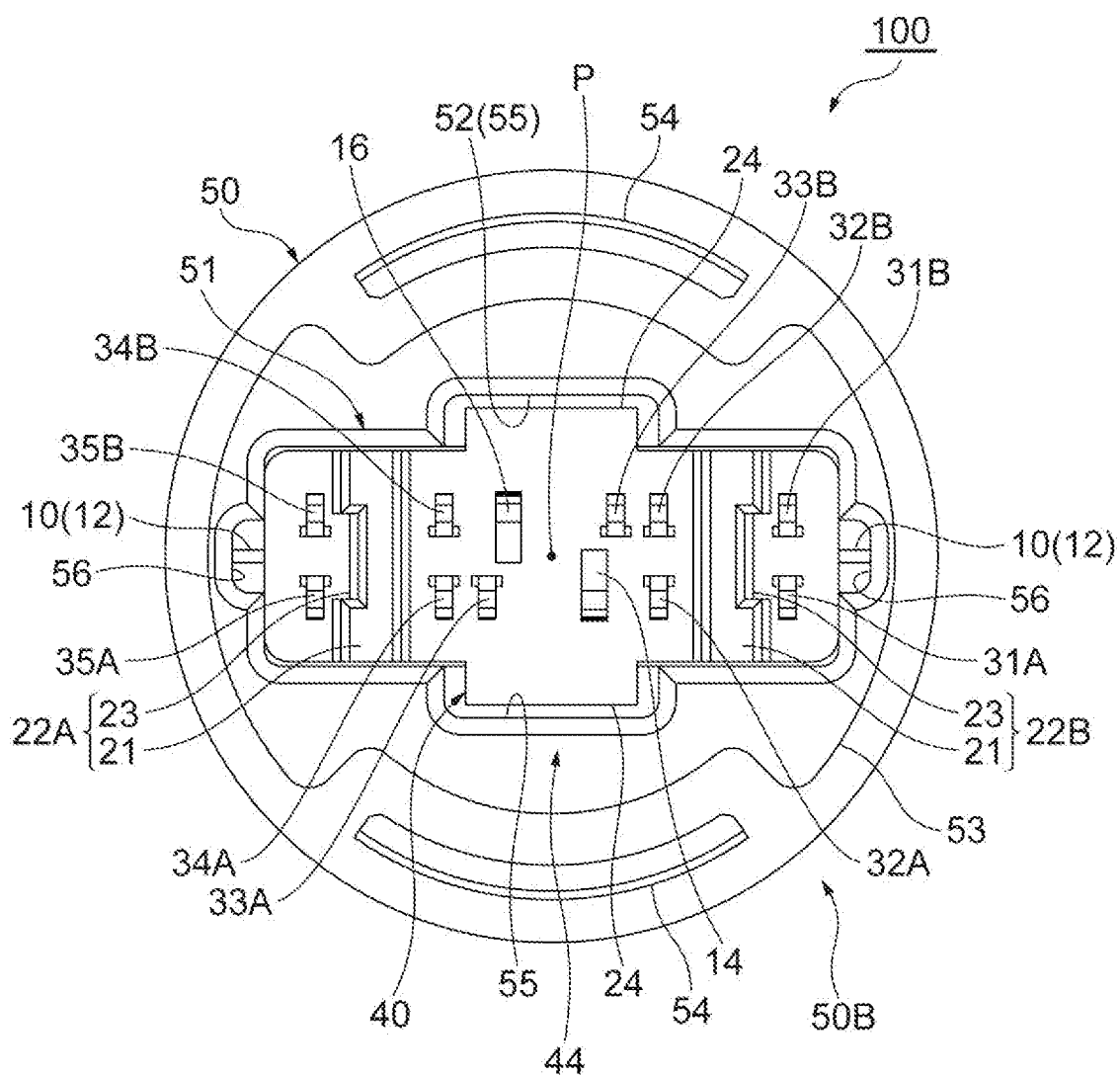
FIG. 11 is a rear view of the connector according to an embodiment.

As illustrated in FIG. 11, the tongue-shaped portion 14 of the plate-shaped conductor 10 is provided between the conductive contact 32A and the conductive contact 33A so as to substantially face the conductive contact 33B in the rear end portion 44. The tongue-shaped portion 16 of the plate-shaped conductor 10 is provided between the conductive contact 33B and the conductive contact 34B so as to substantially face the conductive contact 33A in the rear end portion 44. The tongue-shaped portions 14 and 16 are respectively in contact with terminals provided on the surface and the back surface of a substrate and function as, for example, parts of a ground circuit.

As illustrated in FIG. 3, the housing 20 is provided with a positioning portion 22A having a projection 21 protruding in the direction from the distal end portion 42 toward the rear end portion 44 so as to partition the conductive contacts 34A and 34B and the conductive contacts 35A and 35B from each other in the rear end portion 44. The positioning portion 22A is capable of sufficiently suppressing the occurrence of a short circuit between the conductive contact 34A (34B) and the conductive contact 35A (35B) or the like as well.

The housing 20 is provided with a positioning portion 22B having the projection 21 protruding in the direction from the distal end portion 42 toward the rear end portion 44 so as to partition the conductive contacts 31A and 31B and the conductive contacts 32A and 32B from each other. The positioning portion 22B is capable of sufficiently suppressing the occurrence of a short circuit between the conductive contact 31A (31B) and the conductive contact 32A (32B) or the like as well.

The positioning portions 22A and 22B are provided closer to the middle (inside) than the pair of conductive contacts 31A (31B) and 35A (35B), which have the most lateral (outermost) disposition in the connector main body 40 among the conductive contacts 31A to 35A and 31B to 35B. Accordingly, the connector main body 40 and the connector 100 can be smaller than in a case where the positioning portions are provided more laterally (outside) than the pair of conductive contacts 31A (31B) and 35A (35B). Accordingly, the connector 100 can be more suitably used as a connector for a pen-type electronic device that is required to be reduced in outer diameter.

As illustrated in FIG. 3, the positioning portions 22A and 22B have groove portions 23, which are engaged with a substrate, in addition to the projections 21. The groove portions 23 are provided in the surfaces of the projections 21 that are opposite to the surfaces of the projections 21 facing each other. By the projection 21 having the groove portion 23, the accuracy of substrate positioning can be further increased. Incidentally, in several other embodiments, the projections 21 may have the groove portions 23 in the surfaces of the projections 21 that face each other or may have the groove portions 23 in both the surfaces of the projections 21 that face each other and the surfaces opposite to the surfaces.

As illustrated in FIG. 3, the housing 20 has the upwardly protruding projecting portion 24 on the back surface as well. In this manner, the housing 20 has a symmetrical shape on the surface and the back surface of the connector main body 40. However, the shape of the housing 20 is not limited to the shape symmetrical on the surface and the back surface. For example, the projecting portion 24 may be formed on only one of the surface and the back surface of the connector main body 40.

Figure 4:
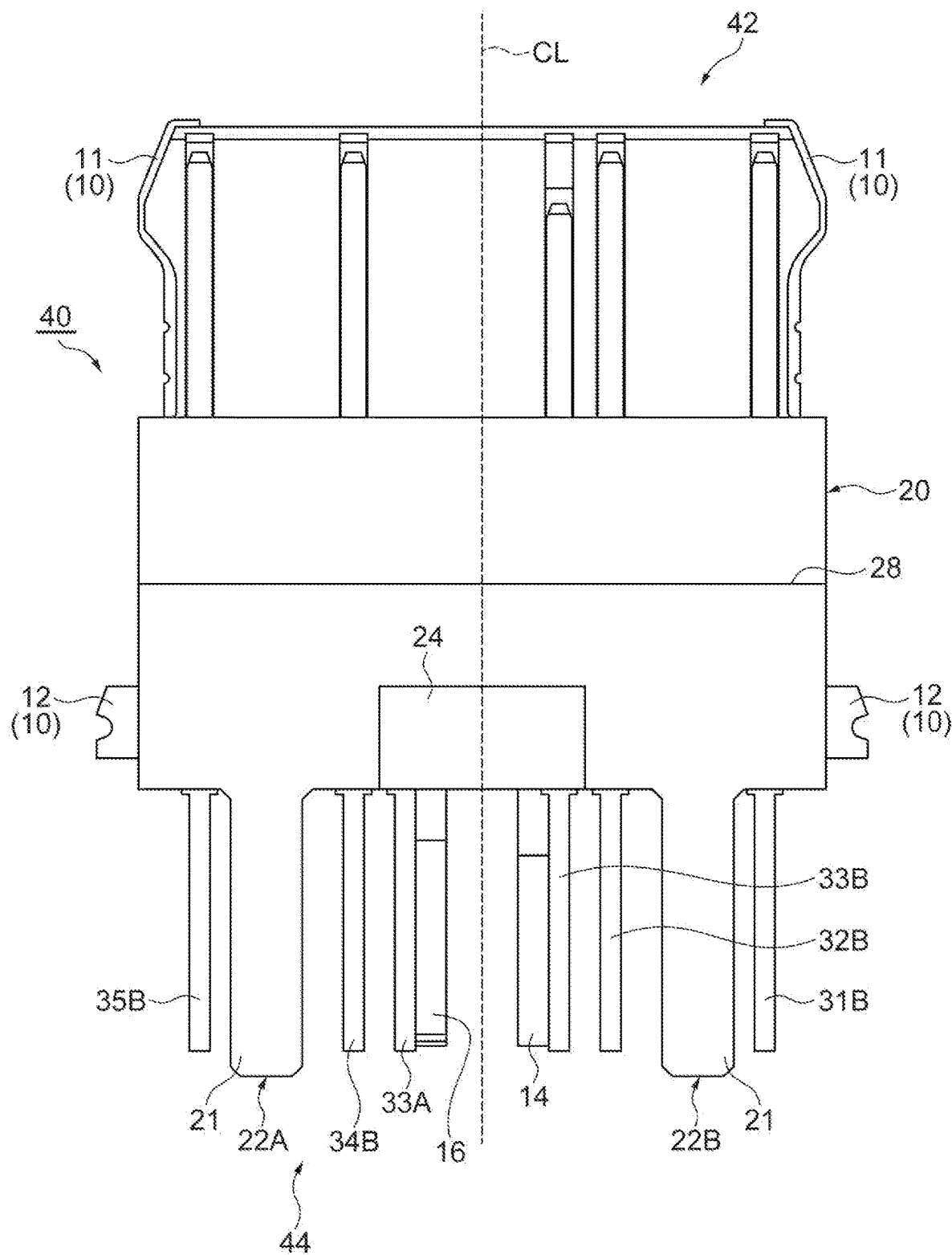
FIG. 4 is a plan view of the connector main body provided in the connector according to an embodiment.

FIG. 4 is a plan view of the connector main body 40. In other words, FIG. 4 is a diagram in which the back side of the connector main body 40 (upper surface in FIG. 3) is viewed in plan. As illustrated in FIG. 4, the conductive contacts 31B and 35B are provided farther from a center line CL of the connector main body 40 than the positioning portions 22A and 22B. In other words, the positioning portions 22A and 22B are provided closer to the center line CL of the connector main body 40 than the conductive contacts 31B and 35B, respectively. Here, the center line CL is a straight line extending along the direction from the distal end portion 42 toward the rear end portion 44. It can also be said that the center line CL is a straight line extending along the direction in which the mating connector is inserted. The center line CL extends in parallel to the longitudinal direction (direction of extension) of the conductive contacts 31B to 35B (31A to 35A).

Although the positional relationship between the positioning portions 22A and 22B and the conductive contacts 31B and 35B has been described with reference to FIG. 4, the positioning portions 22A and 22B and the conductive contacts 31A and 35A have a positional relationship similar to the positional relationship between the positioning portions 22A and 22B and the conductive contacts 31B and 35B also on the front side of the connector main body 40. Although the housing 20 has the two positioning portions 22A and 22B in the present embodiment, the present disclosure is not limited thereto. For example, the connector main body 40 may have one positioning portion located near the middle of the rear end portion 44 so as to overlap the center line CL.

Alternatively, the connector main body 40 may have three or more positioning portions between the conductive contact 31A (31B) and the conductive contact 35B (35B). Incidentally, in another embodiment, the connector main body 40 may further have another positioning portion at a position farther from the center line CL than the conductive contact 31A (31B) and the conductive contact 35B (35B). However, from the viewpoint of reducing the size of the connector 100, it is preferable not to have such an additional positioning portion.

FIG. 5 is a front view of the connector main body 40. In other words, FIG. 5 is a diagram in which the connector main body 40 is viewed from the distal end portion 42 toward the rear end portion 44. The upper part of FIG. 5 corresponds to the surface of the connector main body 40 and the lower part of FIG. 5 corresponds to the back surface of the connector main body 40. The side edge portion 11 of the plate-shaped conductor 10 is exposed in the end portion on the front surface side and the distal end portion 42 of the connector main body 40 and the end portion 12 is exposed so as to protrude sideways from the housing 20 in both side portions of the connector main body 40.

FIG. 6 is a cross-sectional view of the connector main body 40 taken along line VI-VI in FIG. 5. The plate-shaped conductor 10 is embedded in a substantially middle portion of the housing 20 in the direction in which the conductive contact 34A and the conductive contact 34B face each other. The plate-shaped conductor 10 and the conductive contacts 34A and 34B are separated by the cured resin that forms the housing 20. The other conductive contacts are also separated from the plate-shaped conductor 10 by the cured resin that forms the housing 20. The conductive contacts 34A and 34B are formed so as to be vertically symmetrical with respect to the plate-shaped conductor 10 embedded in the housing 20. The conductive contact 34A is located along a surface 10A of the plate-shaped conductor 10 and the conductive contact 34B is located along a back surface 10B. The other conductive contacts are similarly located along the surface 10A and the back surface 10B of the plate-shaped conductor 10. Signal interference between the conductive contacts located along the surface 10A and the back surface 10B, so-called crosstalk, can be suppressed by the plate-shaped conductor 10.

Figure 7:
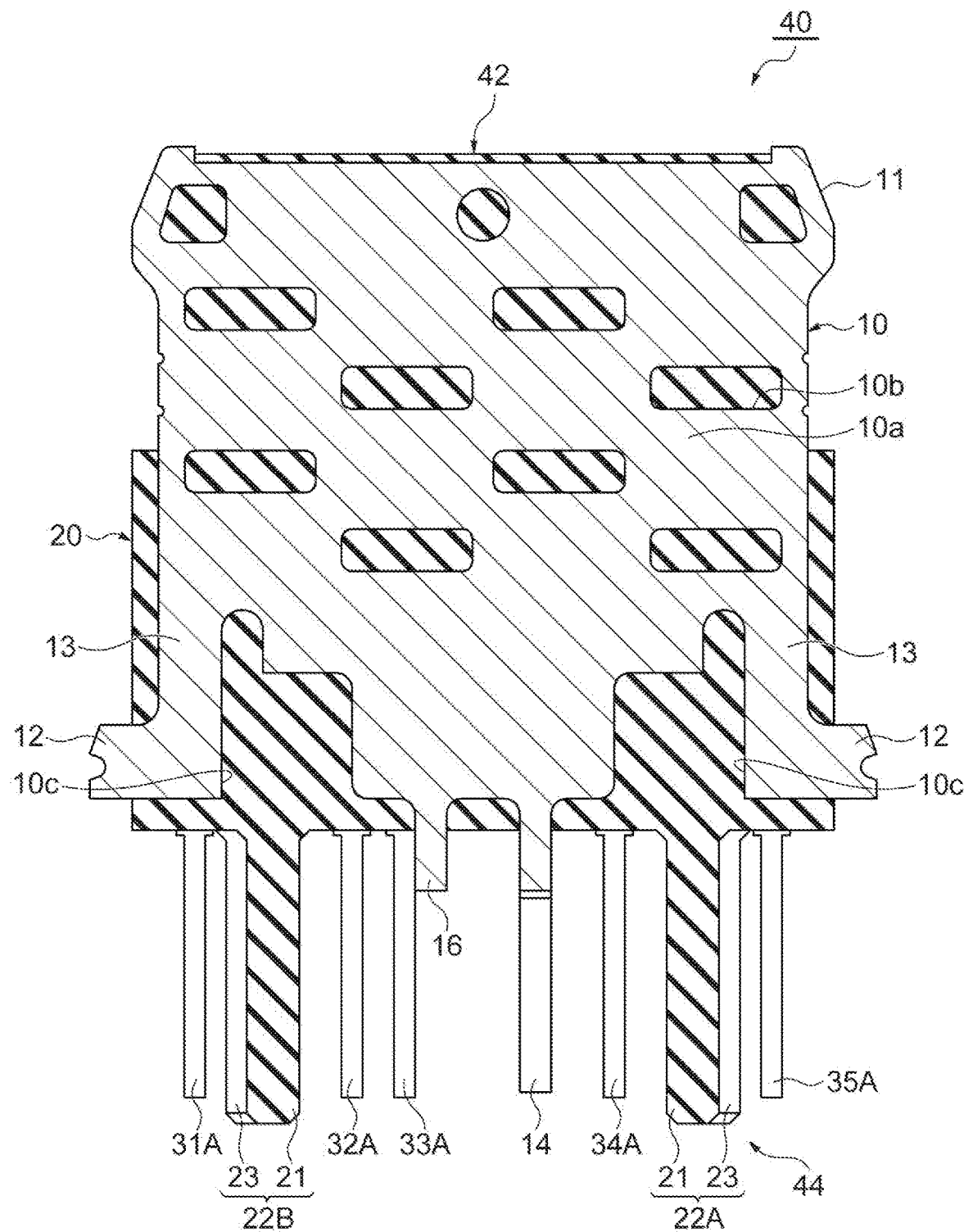
FIG. 7 is a cross-sectional view of the connector main body taken along line VII-VII in FIG. 5.

FIG. 7 is a cross-sectional view of the connector main body 40 taken along line VII-VII in FIG. 5. The plate-shaped conductor 10 has the side edge portion 11 exposed in the end portion on the front surface side and the distal end portion 42 of the connector main body 40, the end portion 12 exposed from the housing 20 in the side portion of the connector main body 40, a main body portion 10a embedded in the housing 20, and the tongue-shaped portions 14 and 16 exposed from the housing 20 in the rear end portion 44 of the connector main body 40. A plurality of through holes 10b are formed so as to be dotted in the main body portion 10a. The main body portion 10a has notch portions 10c at locations corresponding to the vicinity of the proximal end of the positioning portion 22A and the vicinity of the proximal end of the positioning portion 22B.

An elastic portion 13 (connecting portion) between the end portion 12 and the main body portion 10a has a bridge shape by the notch portions 10c and 10c being formed between the pair of end portions 12. Accordingly, when a force in the facing direction of the pair of end portions 12 acts on the pair of end portions 12, the bridge-shaped elastic portions 13 are elastically deformed while biting into the cured resin in the notch portion 10c and the bridge-shaped elastic portions 13 respectively move in the facing direction.

In this case, the elastic portions 13 urge the pair of end portions 12 in the direction opposite to the facing direction with a stress commensurate with the amount of deformation resulting from the movement.

Figure 8:
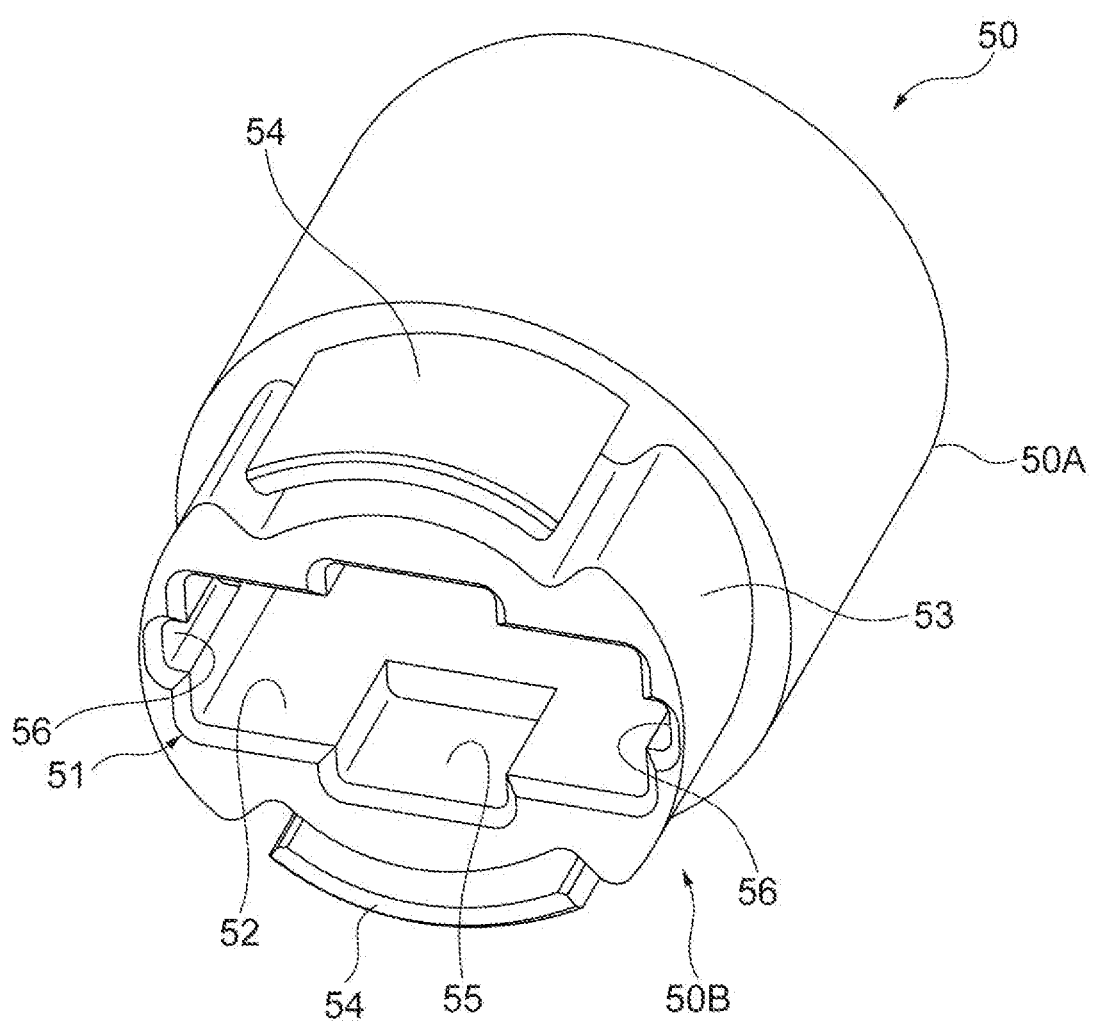
FIG. 8 is a perspective view in which a shell (casing) provided in the connector according to an embodiment is viewed from the rear surface side.

FIG. 8 is a perspective view in which the casing 50 is viewed from the rear surface side. The casing 50 has a pair of circular arc-shaped locking portions 54 formed in the connecting portion 50B and along the outer peripheral surface of the main body portion 50A and located so as to face each other and a protruding portion 53 provided between the pair of locking portions 54 and having the through hole 51 communicating with the main body portion 50A.

A pair of the recesses 55 are formed in the inner wall 52 of the casing 50 forming the through hole 51 so as to face each other in the vertical direction in FIG. 8. When the connector main body 40 is fixed to the casing 50, the recess 55 abuts against the projecting portion 24 of the connector main body 40. As a result, it is possible to regulate an excessive movement of the connector main body 40 in the depth direction in FIG. 8 with respect to the through hole 51 of the casing 50.

A pair of step portions 56 are formed in the inner wall 52 of the casing 50 forming the through hole 51 so as to face each other in the left-right direction in FIG. 8. The step portion 56 is formed in a groove shape in the inner wall 52 so as to be engageable with the end portion 12 of the plate-shaped conductor 10. The shape of the step portion 56 is not limited thereto. In another embodiment, the step portions 56 may take the form of projections vertically sandwiching the end portion 12 of the plate-shaped conductor 10.

Figure 9:
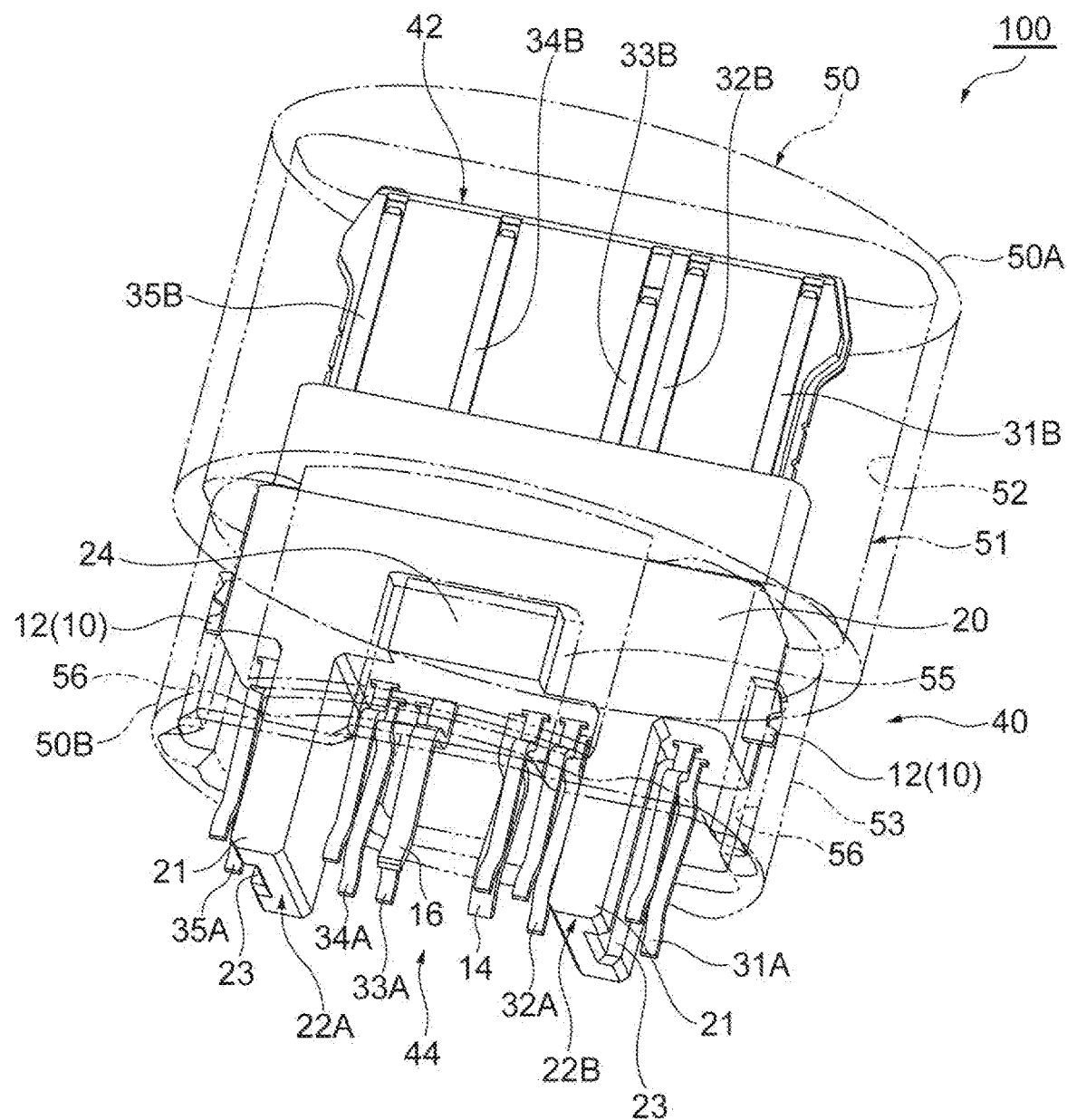
FIG. 9 is a diagram illustrating the connector main body that is fixed to the shell (casing) in the connector according to an embodiment.
Figure 10:
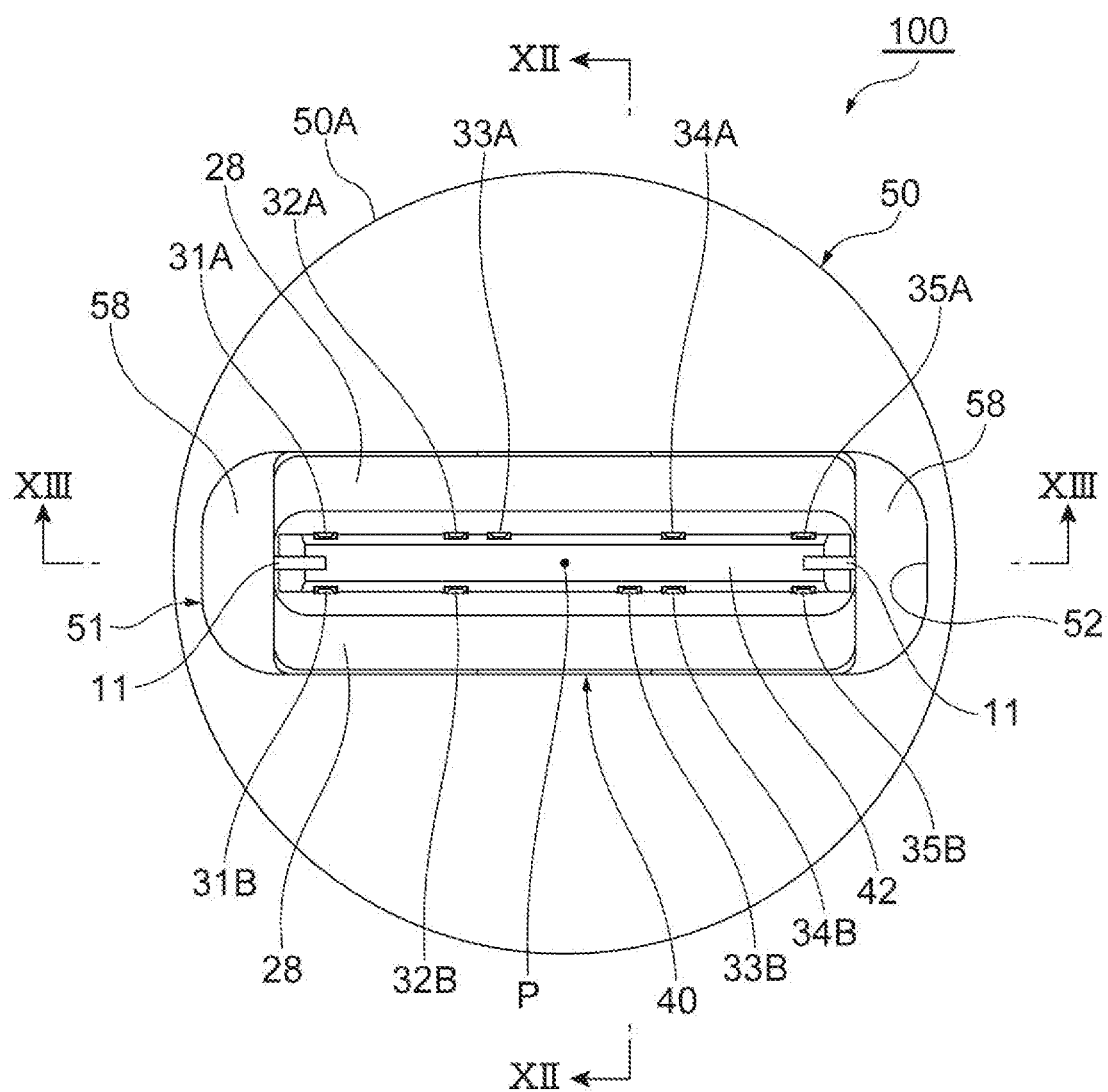
FIG. 10 is a front view of the connector according to an embodiment.

FIG. 9 is a diagram illustrating the connector main body 40 that is fixed to the casing 50 in the connector 100. In FIG. 9, the casing 50 is indicated by a two-dot chain line and the connector main body 40 is indicated by a solid line so that understanding of the state where the connector main body 40 is fixed to the casing 50 is facilitated. FIG. 10 is a front view of the connector 100 and FIG. 11 is a rear view of the connector 100.

As illustrated in FIGS. 9 and 11, the end portion 12 of the plate-shaped conductor 10 in the connector main body 40 is locked to the groove-shaped step portion 56. As a result, the distal end portion 42 of the connector main body 40 electrically connected to the mating connector inserted into the through hole 51 is located in the through hole 51.

The end portion 12 of the plate-shaped conductor 10 abuts against the inner wall 52 of the metallic casing 50, and thus the casing 50 is capable of functioning as a part of a ground (earth) circuit. Accordingly, it is possible to suppress static electricity generation, protect the internal circuit of the substrate incorporated in the pen-type electronic device, and improve the reliability of the pen-type electronic device.

The means for fixing the end portion 12 of the plate-shaped conductor to the inner wall 52 is not limited to the above. For example, in several other embodiments, the end portion 12 may be fixed to the inner wall 52 by the end portion 12 and the step portion 56 being joined by soldering or welding.

As illustrated in FIG. 9, the positioning portions 22A and 22B are provided with the projections 21. The projections 21 protrude in the direction from the distal end portion 42 of the connector main body 40 toward the rear end portion 44 beyond the conductive contacts 31A to 35A and 31B to 35B and the plate-shaped conductor 10 (tongue-shaped portions 14 and 16). Accordingly, when a substrate is connected to the rear end portion 44 of the connector main body 40, the positioning portions 22A and 22B (projections 21) come into contact with the substrate before the conductive contacts 31A to 35A and 31B to 35B and the tongue-shaped portions 14 and 16 of the plate-shaped conductor 10 come into contact with the substrate. Accordingly, it is possible to suppress, for example, deformation and breakage of the conductive contacts 31A to 35A and 31B to 35B and the tongue-shaped portions 14 and 16 of the plate-shaped conductor 10.

As illustrated in FIG. 10, the inner wall 52 forming the through hole 51 of the casing 50 has an abutting surface 58 standing on the inner wall 52. When the mating connector is inserted in the through hole 51 of the casing 50 of the connector 100 and connected to the distal end portion 42 of the connector main body 40, the distal end of the mating connector abuts against the metallic abutting surface 58 and front walls 28 and 28 of the connector main body 40, which are formed along the respective contact arrangement directions of the conductive contacts 31A to 35A on the surface and the conductive contacts 31B to 35B on the back surface. The depth of insertion of the mating connector into the through hole 51 is regulated by the distal end of the mating connector abutting against the abutting surface 58 and the front wall 28 as described above.

The distal end of the mating connector abuts against the metallic abutting surface 58 as well as the front wall 28 of the connector main body 40. The connector 100 has the metallic abutting surface 58, and thus it is possible to suppress breakage attributable to an excessive insertion force during mating connector connection. Accordingly, the connection reliability of the connector 100 can be improved.

When the connector 100 is viewed from the front surface side of the connector main body 40 as in FIG. 10, the conductive contacts 31A to 35A provided along the surface 10A (see FIG. 6) of the plate-shaped conductor 10 and the conductive contacts 31B to 35B provided along the back surface 10B are located such that a central axis P of the connector 100 is the center of symmetry. Accordingly, the connector 100 can also be used as a highly versatile connector such as a USB Type-C connector usable on both the surface and the back surface of the connector.

Figure 12:
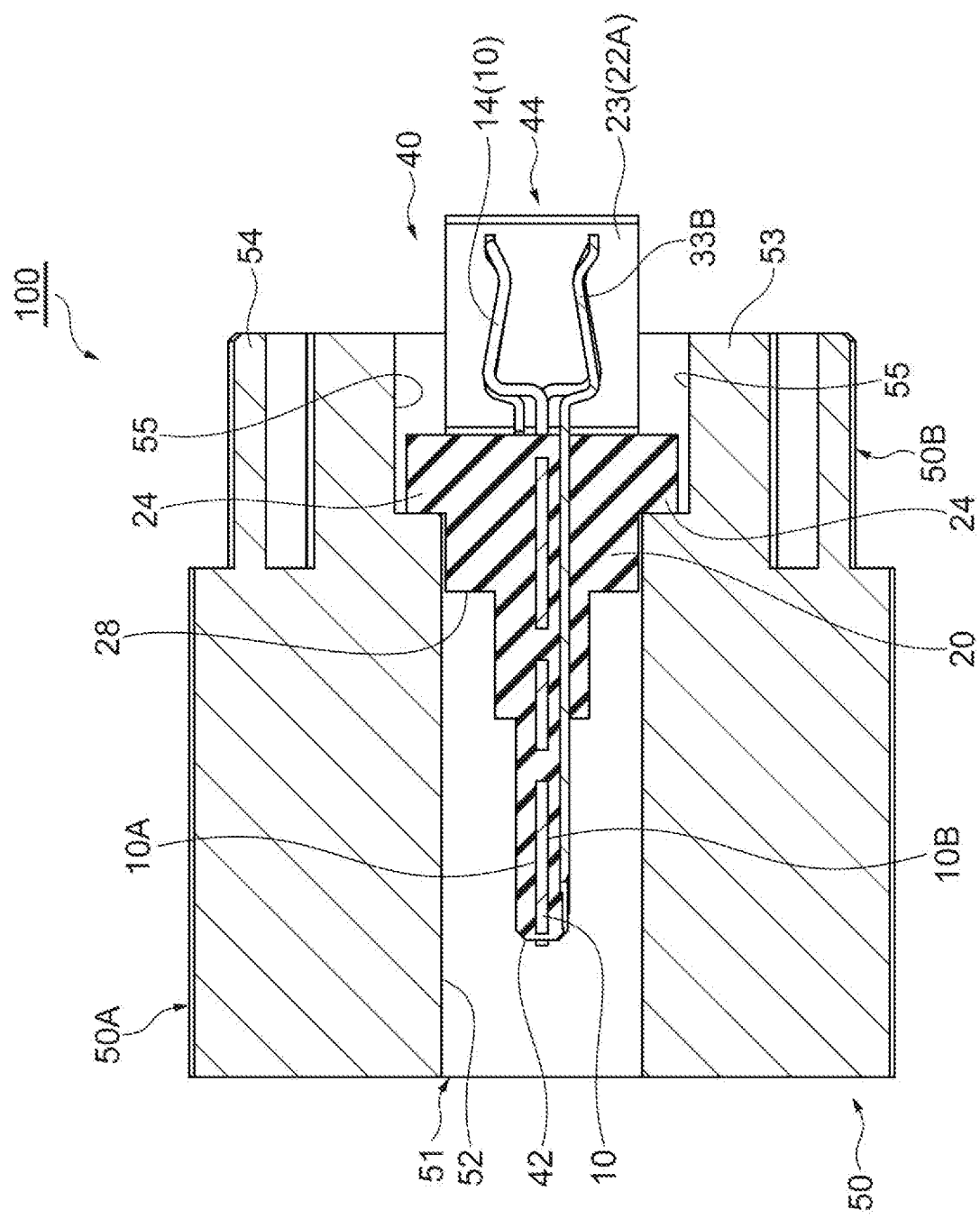
FIG. 12 is a cross-sectional view taken along line XII-XII in FIG. 10.
Figure 13:
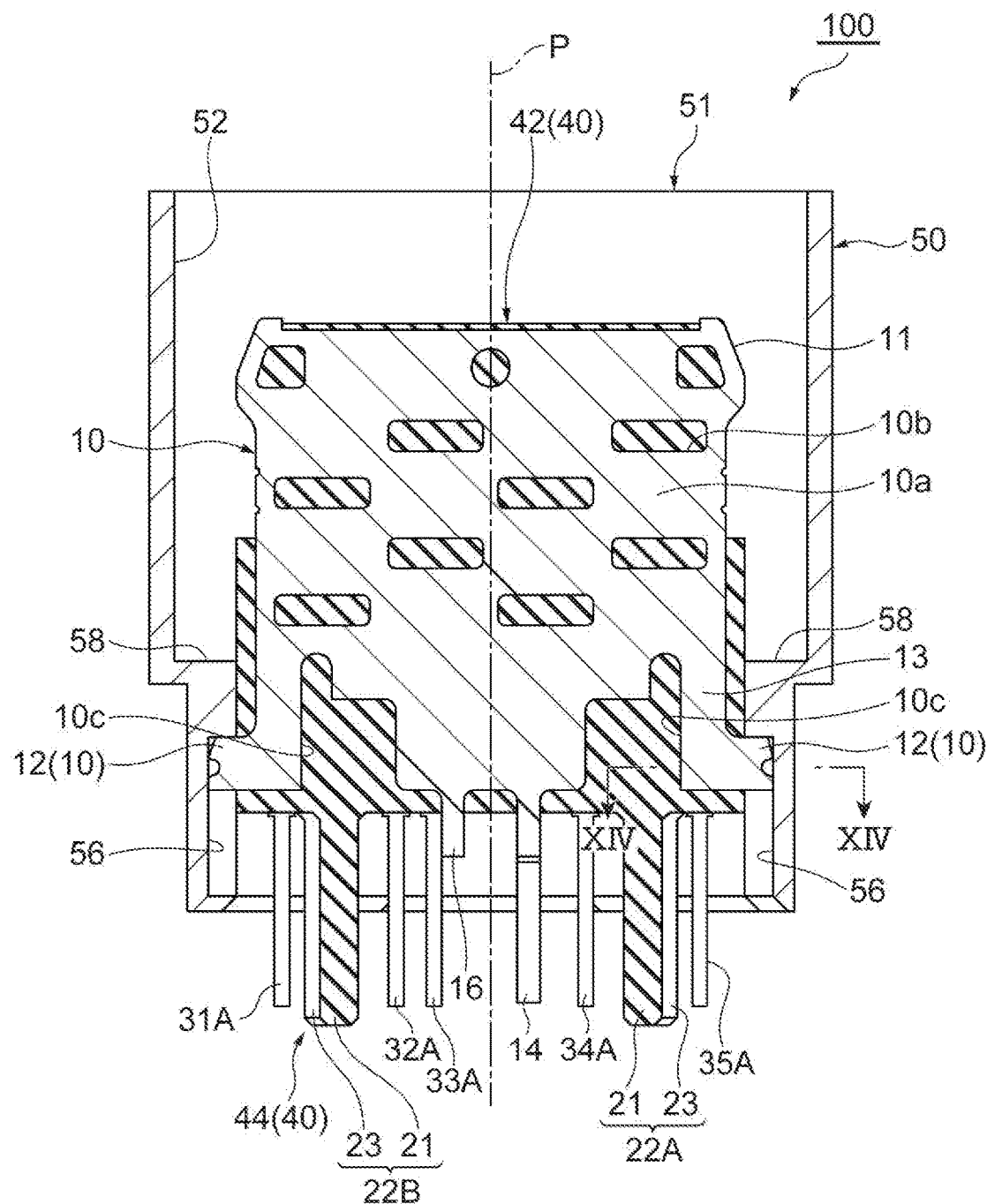
FIG. 13 is a cross-sectional view taken along line XIII-XIII in FIG. 10.

FIG. 12 is a cross-sectional view taken along line XII-XII in FIG. 10. FIG. 13 is a cross-sectional view taken along line XIII-XIII in FIG. 10. As illustrated in FIG. 12, in the connector 100, the projecting portion 24 of the connector main body 40 abuts against the recess 55 formed in the through hole 51 of the casing 50. The abutting surface 58 formed in the through hole 51 of the casing 50 illustrated in FIG. 13 becomes a surface of contact with the distal end portion of the mating connector together with the front wall 28 of the connector main body 40 illustrated in FIG. 12.

As illustrated in FIG. 13, the end portion 12 of the plate-shaped conductor 10 is fixed to the step portion 56 of the casing 50. As a result, the end portion 12 is satisfactorily fixed to the inner wall 52 of the casing 50 forming the through hole 51 and the reliability of the connector 100 can be improved. The gap between the pair of end portions 12 in the plate-shaped conductor 10 may be smaller than the gap prior to attachment of the connector main body 40 to the casing 50 by elastic deformation of the elastic portion 13 configured as a bridge portion. In this case, the end portions 12 are urged toward the step portion 56 by the stress that is generated with the elastic deformation of the elastic portion 13. As a result, the end portions 12 are better fixed to the inner wall 52 of the casing 50 forming the through hole 51. Accordingly, the reliability of the connector 100 can be further improved even during inter-metal member fixing.

The connection between the casing 50 and the connector main body 40 may be reinforced by means of an adhesive, solder, or the like. For example, the contact surface between the recess 55 and the projecting portion 24 may be fixed by means of an adhesive and the end portion 12 of the plate-shaped conductor 10 and the step portion 56 of the casing 50 may be fixed by means of solder.

Figure 14:
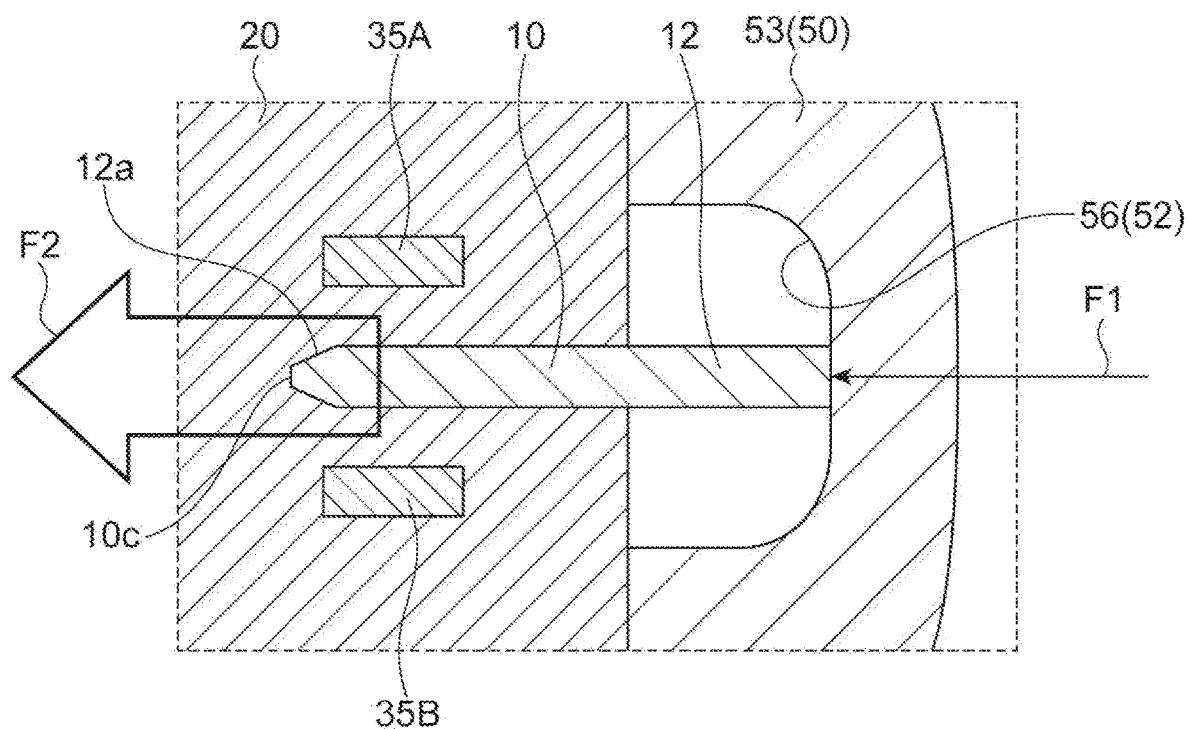
FIG. 14 is a cross-sectional view taken along line XIV-XIV in FIG. 13.

FIG. 14 is a cross-sectional view taken along line XIV-XIV in FIG. 13. In other words, FIG. 14 is an enlarged partial cross-sectional view illustrating the vicinity of the abutting part between the end portion 12 of the plate-shaped conductor 10 and the step portion 56 of the through hole 51. A reaction force F1 from the step portion 56 acts on the end portion 12 as illustrated in FIG. 14 when the end portion 12 of the plate-shaped conductor 10 urges the step portion 56 by the stress that results from elastic deformation of the elastic portion 13 illustrated in FIG. 13.

When the reaction force F1 acts, the notch portion 10c of the plate-shaped conductor 10 bites into the housing 20 along the arrow F2 direction. Here, the plate-shaped conductor 10 has a tapered portion 12a at the outer edge that forms the notch portion 10c and the thickness of the tapered portion 12a decreases toward the central axis P. Accordingly, the plate-shaped conductor 10 (notch portion 10c) is capable of biting into the housing 20 with ease. As a result, the notch portion 10c is locked to the housing 20 and rattling of the end portion 12 can be suppressed. Accordingly, the connector main body 40 can be fixed to the casing 50 with sufficient firmness.

Figure 15:
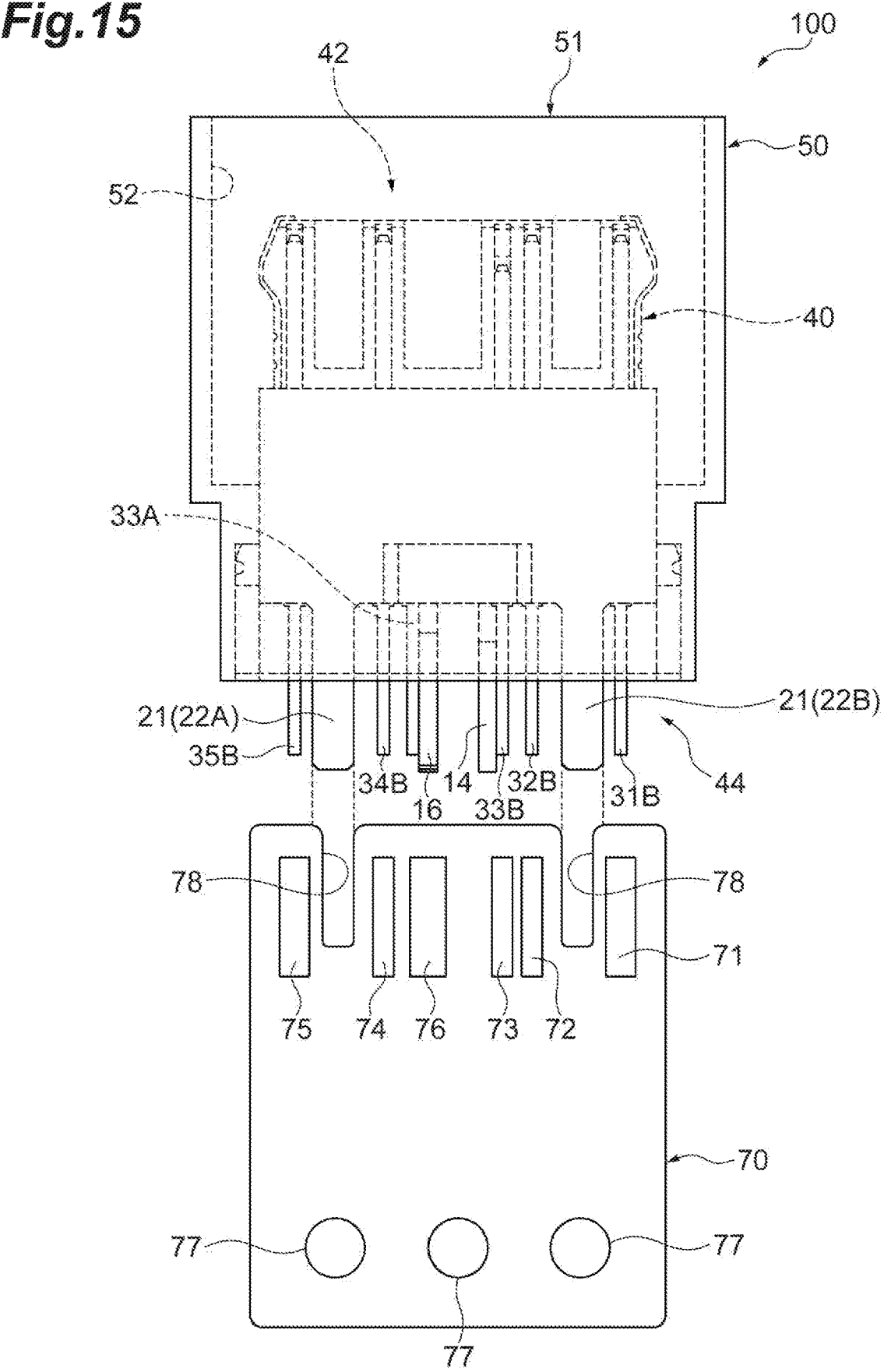
FIG. 15 is a diagram illustrating a process of attaching a substrate to the connector according to an embodiment.

FIG. 15 is a diagram illustrating a process of attaching the substrate 70 to the connector 100. The substrate 70, which is incorporated into the pen-type electronic device, has terminals 71 to 75 on one surface of the substrate 70. The terminals 71 to 75 are electrically connected to the conductive contacts 31B to 35B of the connector 100. In addition, the substrate 70 has a terminal 76 on that surface and the terminal 76 is electrically connected to the tongue-shaped portion 16 of the connector 100. The substrate 70 has terminals electrically connected to the conductive contacts 31A to 35A and the tongue-shaped portion 14 on the other surface as well similarly to that surface. The substrate 70 has notch portions 78 and 78 with which the positioning portions 22A and 22B of the connector 100 are respectively engaged.

In a case where the substrate 70 is attached to the connector 100, the notch portion 78 and the positioning portions 22A and 22B are aligned first. Then, the substrate 70 is brought close to the connector 100 and the projections 21 of the positioning portions 22A and 22B are inserted into the notch portion 78. Then, the distal end of the projection 21 of the connector 100 is allowed to abut against the bottom portion of the notch portion 78. Obtained as a result is a connector 110 having the substrate 70 as illustrated in FIG. 16.

As illustrated in FIG. 15, the projections 21 of the positioning portions 22A and 22B protrude in the direction from the distal end portion 42 of the connector main body 40 toward the rear end portion 44 beyond the conductive contacts 31A to 35A and 31B to 35B and the tongue-shaped portions 14 and 16. Accordingly, when the substrate 70 is attached to the connector 100, the projection 21 comes into contact with the substrate 70 first. Accordingly, it is possible to suppress the substrate 70 coming into contact with the conductive contacts 31A to 35A and 31B to 35B and the tongue-shaped portions 14 and 16 before coming into contact with the projection 21. Accordingly, deformation, breakage, and the like of the members can be suppressed.

The positioning portions 22A and 22B also have the function of guiding the connection between the connector 100 and the substrate 70. The relative positional relationship between the connector main body 40 (connector 100) and the substrate 70 is determined by the positioning portions 22A and 22B having the projection 21. Further, the projection 21 has the groove portion 23 as illustrated in FIG. 9. The notch portion 78 of the substrate 70 and the groove portion 23 are engaged with each other by fitting of the notch portion 78 of the substrate 70 into the groove portion 23. As a result, it is possible to suppress misalignment of the substrate 70 with respect to the connector 100 in the direction in which the conductive contacts 31A to 35A and the conductive contacts 31B to 35B face each other. Accordingly, the positioning accuracy of the connector 100 and the substrate 70 can be further improved. In addition, it is possible to suppress deformation of each of the conductive contacts 31A to 35A and 31B to 35B attributable to misalignment and rattling of the substrate 70 in the same direction.

Figure 16:
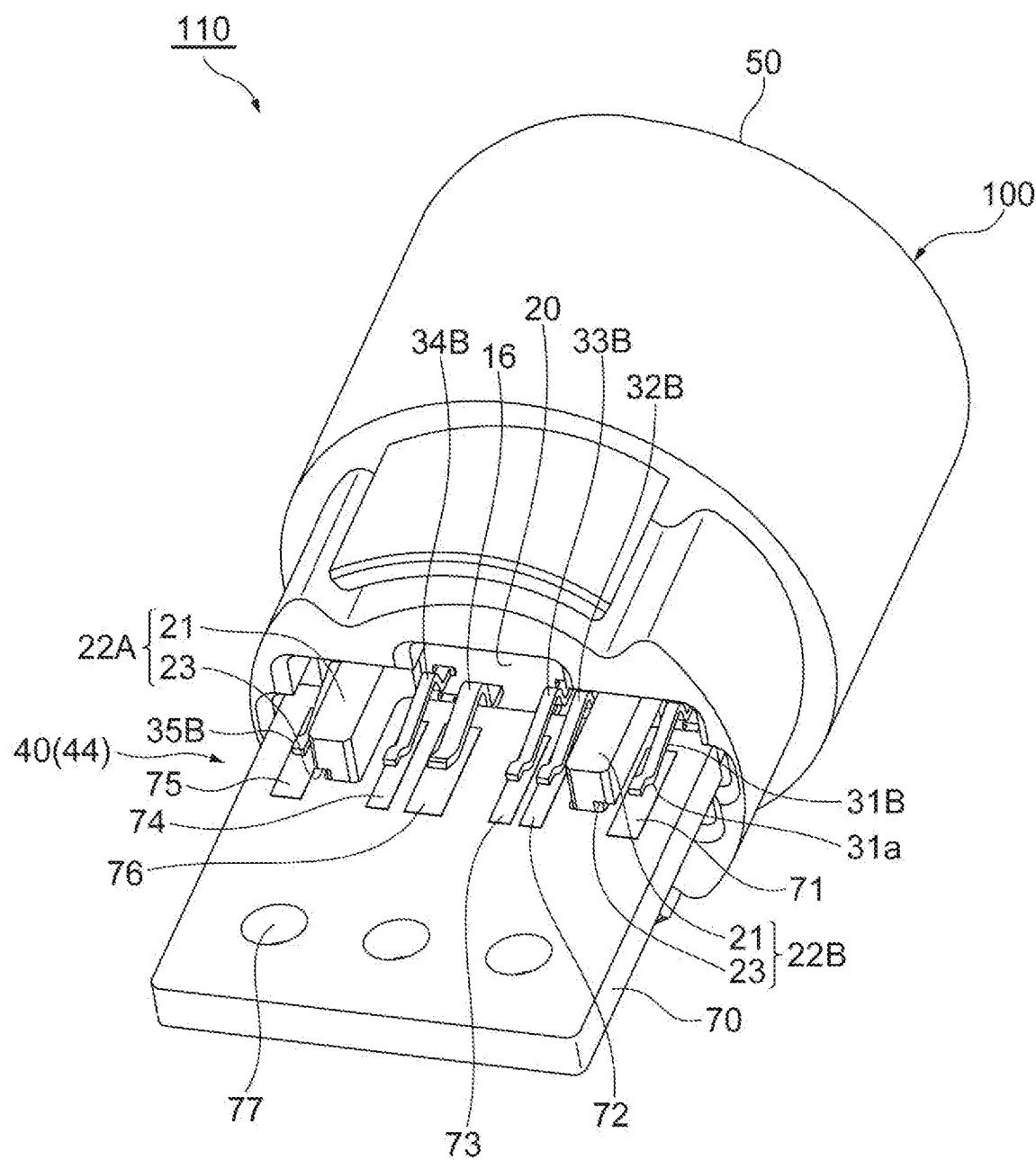
FIG. 16 is a perspective view of a connector according to another embodiment.

FIG. 16 is a perspective view of the connector 110 according to another embodiment. The connector 110 is provided with the connector 100 and the substrate 70 connected to the rear end portion 44 of the connector main body 40. A device provided with a substrate is referred to as a connector device in some cases. The terminals 71 to 75 and the terminal 76 on one surface side of the substrate 70 are electrically connected to the conductive contacts 311B to 35B and the tongue-shaped portion 16 of the plate-shaped conductor 10 respectively exposed from the housing 20 in the rear end portion 44 of the connector main body 40. The connector 110 (connector device 110) is a structure integrated with the substrate 70, and thus pen-type electronic device manufacturing processes can be simplified with the connector 110 (connector device 110). Incidentally, the terminals on the other surface side of the substrate 70 are electrically connected to the conductive contacts 31A to 35A and the tongue-shaped portion 14 as is the case with the one surface side.

As illustrated in FIG. 16, the conductive contact 31B on the back surface of the connector main body 40 in the connector 100 has a connection portion 31a, which comes into contact with the terminal 71 of the substrate 70. Likewise, the other conductive contacts 32B to 35B and the tongue-shaped portion 16 have connection portions respectively coming into contact with the terminals 72 to 75 and the terminal 76 of the substrate 70. The conductive contacts 31B to 35B and the tongue-shaped portion 16 and the terminals 71 to 76 are electrically interconnected by such connection portions. Although not illustrated in FIG. 16, the conductive contacts 31A to 35A and the tongue-shaped portion 14 on the surface of the connector main body 40 similarly have connection portions respectively coming into contact with the terminals 71 to 75 and the terminal 76 of the substrate 70. The manufacturing efficiency of a pen-type electronic device 150 (FIG. 17) can be improved by such connection portions being provided. The tongue-shaped portions 14 and 16 are electrically connected to the terminal 76 of the substrate 70 and function as parts of a ground circuit or the like. The conductive contacts 31A to 35A and the conductive contacts 31B to 35B are connected to the terminals 71 to 75 of the substrate 70 and function as conductive contacts for signal transmission, electric power supply, ground, or the like.

Figure 17:
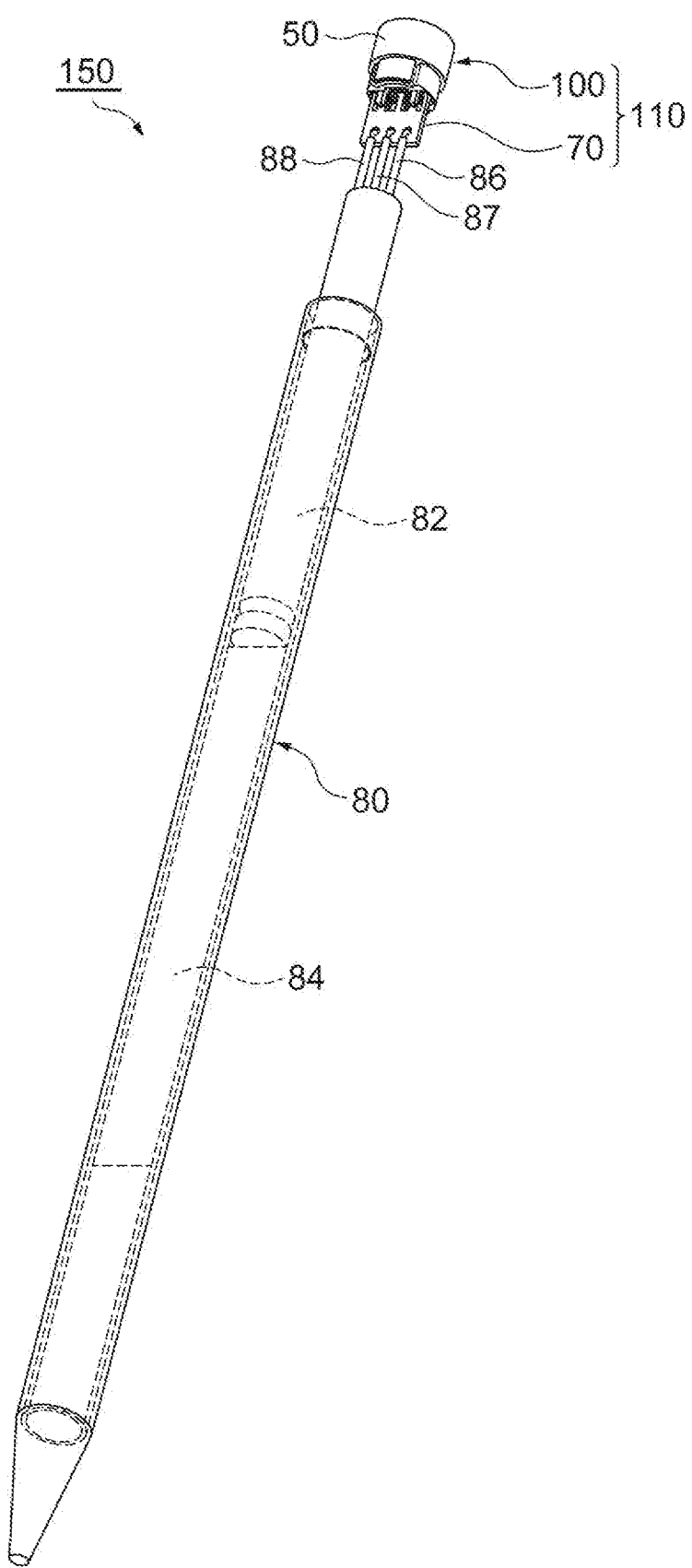
FIG. 17 is a diagram illustrating the structure of a pen-type electronic device.

FIG. 17 is a diagram illustrating the structure of the pen-type electronic device 150 provided with the connector 100 to which the substrate 70 is connected, that is, the connector 110. The pen-type electronic device 150 is provided with a cylindrical pen main body portion 80 forming the exterior of the pen-type electronic device 150. The connector 100 (connector 110) is attached to the upper end of the pen main body portion 80. The casing 50 of the connector 100 (connector 110) forms the exterior of the pen-type electronic device 150 together with the pen main body portion 80.

In the pen main body portion 80, a circuit portion 84, a battery 82, and the substrate 70 are accommodated in this order from the nib and in a straight line. The substrate 70 is connected to the connector 100 at one end. At the other end, the substrate 70 is connected to cables 86, 87, and 88 for electrically interconnecting the substrate 70 and the battery 82 or the substrate 70 and the circuit portion 84.

Examples of the circuit portion 84 include circuit portions provided with a printed wiring board, a connection terminal, various integrated circuits, and an electronic component. Specifically, the examples include a control unit controlling each member, a memory storing information, and a communication module. The battery 82 is preferably a rechargeable battery. Examples of the battery 82 include lithium-ion and nickel-hydrogen batteries. The conductive contacts 31A to 35A and 31B to 35B (FIG. 9) of the connector 100 form an electric circuit in the pen-type electronic device 150 together with the substrate 70, the cables 86, 87, and 88, the battery 82, and the circuit portion 84. In the pen-type electronic device 150, the plate-shaped conductor 10 (FIG. 12) forms a ground circuit different from the electric circuit together with the casing 50.

The configurations in the pen main body portion 80 are not limited to the above description and any member other than the above-described members may be accommodated. Examples of the member include a writing pressure sensor detecting pressure applied to the nib, a vibrator vibrating when turned on, and an optical module.

Figure 18:
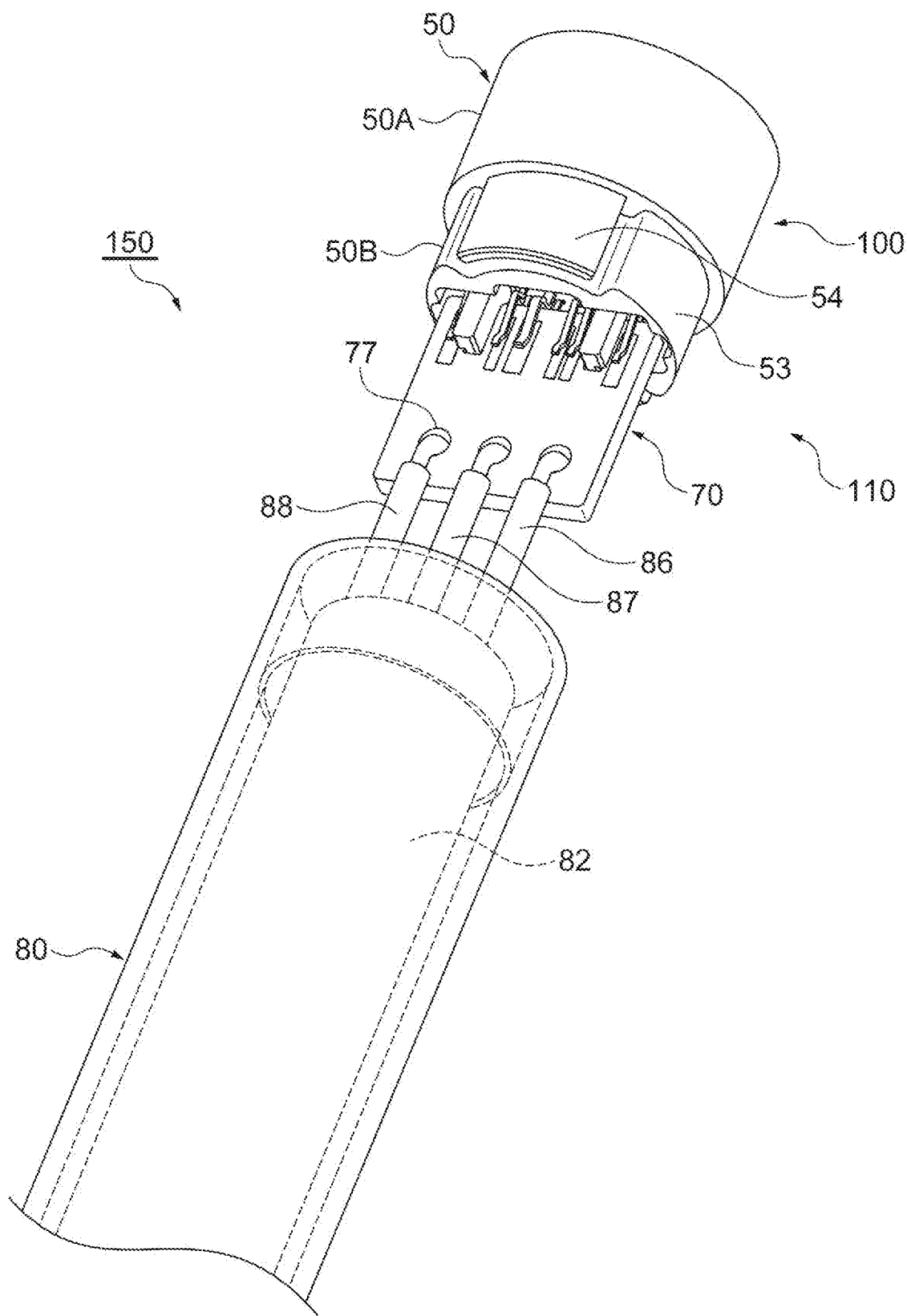
FIG. 18 is a diagram illustrating the connection structure in the upper end portion of the pen-type electronic device in FIG. 17.

FIG. 18 is a diagram illustrating the connection structure in the upper end portion of the pen-type electronic device 150 in FIG. 17. The cables 86, 87, and 88 are connected to three terminals 77, which are provided on the side of the substrate 70 that is opposite to the terminal on the connector 100 side. The connector 100 is electrically connected to the battery 82 and the circuit portion 84 via the cables 86, 87, and 88 and the substrate 70. The connector 100 is attached to the pen main body portion 80 by the connecting portion 50B being inserted into the upper end of the pen main body portion 80. In this manner, the connecting portion 50B is accommodated in the pen main body portion 80 and the main body portion 50A of the casing 50 forms the outer shape of the pen-type electronic device 150 integrally with the pen main body portion 80.

The locking portion 54 in the connecting portion 50B may be a leaf spring or the like. In this case, it is possible to fix the connector 100 to the pen main body portion 80 by attaching the connector 100 to the pen main body portion 80 such that the locking portion 54 urges the hollow wall of the pen main body portion 80. In another example, the locking portion 54 and the pen main body portion 80 may be fixed by means of an adhesive.

Figure 19:
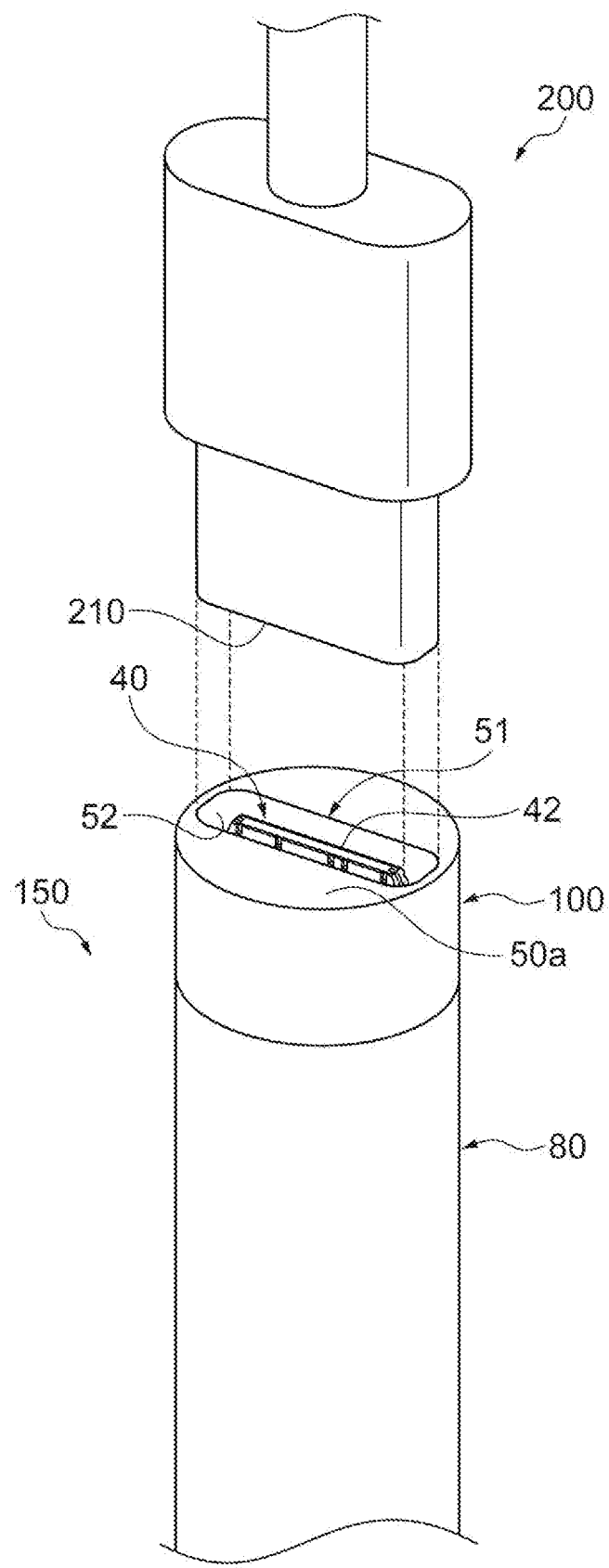
FIG. 19 is a diagram describing connection between a mating connector and a connector provided in the pen-type electronic device.

FIG. 19 is a diagram describing connection between a mating connector 200 and the connector 100 provided in the pen-type electronic device 150. The mating connector 200 is provided with an insertion portion 210 on one end side and the insertion portion 210 is inserted into the through hole 51 in the casing 50 of the connector 100. The other end side of the mating connector 200 is connected to, for example, an AC power source or an information device such as a personal computer.

The distal end portion 42 of the connector main body 40 and the insertion portion 210 are electrically connected to each other by the insertion portion 210 of the mating connector 200 being inserted into the through hole 51. As a result, the pen-type electronic device 150 can be charged or signal transmission and reception can be performed between the pen-type electronic device 150 and an external information device. At this time, the distal end of the mating connector 200 abuts against the abutting surface 58 formed in the through hole 51 of the casing 50 and the front wall 28 illustrated in FIG. 10. Since the abutting surface 58 is metallic, the occurrence of deformation, breakage, and the like of the connector main body 40 is sufficiently suppressed even when the mating connector 200 is repeatedly connected and disconnected. Accordingly, the connector 100 is excellent in durability.

Although several embodiments have been described above, the present invention is not limited to the embodiments. For example, although the conductive contacts are provided along the surface and the back surface of the plate-shaped conductor in the connectors of the embodiments described above, the present disclosure is not limited thereto. For example, the conductive contacts may be provided along only one of the surface and the back surface of the plate-shaped conductor. In addition, for example, the conductive contacts provided along the surface of the plate-shaped conductor and the conductive contacts provided along the back surface of the plate-shaped conductor may be located so as to face each other without exception. Further, the number of the conductive contacts is not particularly limited and the number may be one or two or more.

The housing 20 may not be configured as a single member. For example, two or more cured resins may form the housing 20. In this case, the two or more cured resins may be in contact with or apart from each other. The plate-shaped conductor 10 may not have the tongue-shaped portions 14 and 16. The shape of the through hole 51 of the casing 50 is not particularly limited insofar as the distal end portion 42 of the connector main body 40 can be located and a mating connector can be inserted.

In the embodiments described above, the positioning portions 22A and 22B are provided with the projection 21 and the relative positional relationship between the connector main body 40 and the substrate 70 is determined by the projection 21 being inserted into the notch portion 78 of the substrate 70 as illustrated in FIG. 15 and so on. The present disclosure is not limited thereto. For example, a recess sandwiching the substrate 70 in the thickness direction may be formed in the projection 21 and the connector main body 40 and the substrate 70 may be positioned by means of the recess. In addition, the positioning portions 22A and 22B may not be projections and a notch portion formed in the housing 20 may be used as a positioning portion. In this case, it is possible to position the connector main body 40 and the substrate 70 by preparing a substrate having a projection that can be inserted into the notch portion and inserting the projection of the substrate into the notch portion.

The connector 100 and the connector 110 may have a lid covering the through hole 51 from the surface 50a side of the casing 50.

Next, an example of a method for manufacturing the connector 100 and the connector 110 will be described. First, the connector main body 40 as illustrated in FIGS. 2 to 7 is manufactured. Specifically, the plate-shaped conductor 10 having a predetermined shape is prepared and a component in which a part of the plate-shaped conductor 10 is embedded by an insulating cured resin (housing 20) is obtained by injection molding or the like. At this time, the tongue-shaped portions 14 and 16, the end portion 12, and the side edge portion 11 of the plate-shaped conductor 10 are molded so as to be exposed from the housing 20. In addition, through holes for press-fitting the conductive contacts 31A to 35A and 31B to 35B are formed in the housing 20.

Prepared next are the conductive contacts 31A to 35A and 31B to 35B that are commercially available or manufactured by a known method. The conductive contacts 31A to 35A and 31B to 35B are press-fitted into the through holes formed in the housing 20. In this manner, the connector main body 40 as illustrated in FIGS. 2 to 7 can be obtained (connector main body manufacturing process).

The metallic casing 50 as illustrated in FIG. 8 is prepared apart from the connector main body 40. The casing 50 may be machined into a predetermined shape by shaving or may be manufactured by casting or a metal injection method using metal powder and a binder (casing manufacturing process).

After the connector main body 40 and the casing 50 are prepared, the connector 100 is manufactured by the connector main body 40 and the casing 50 being combined with each other as illustrated in FIGS. 9 to 13. Before the combination, the distance between the pair of end portions 12 of the connector main body 40 may exceed the distance between the bottom portions in the pair of step portions 56 of the casing 50. In this case, the end portion 12 of the connector main body 40 urges the step portion 56 by the elastic portion 13 when the connector main body 40 of the connector 100 is fixed to the inner wall 52 forming the through hole 51 of the casing 50. Accordingly, the connector main body 40 can be firmly fixed to the casing 50 (fixing process).

Next, the connector 110 is manufactured by the substrate 70 being connected to the connector 100 as illustrated in FIG. 15. At this time, the substrate 70 is positioned by the positioning portions 22A and 22B. In addition, the positioning portions 22A and 22B guide the connection of the substrate 70. Accordingly, the positional relationship between the connector 100 and the substrate 70 can be adjusted with sufficiently high accuracy and deformation or breakage of the conductive contacts 31A to 35A and 31B to 35B and the tongue-shaped portions 14 and 16 can be sufficiently suppressed (attachment process).

The manufacturing method is not limited to the above-described example of the method for manufacturing the connector 100 and the connector 110. For example, although the conductive contacts 31A to 35A and 31B to 35B are held in the housing 20 by press-fitting in the example described above, the holding may be performed by so-called insert molding for the conductive contacts 31A to 35A and 31B to 35B to be embedded in the housing 20 along with the plate-shaped conductor 10 when the housing 20 is molded.

INDUSTRIAL APPLICABILITY

Provided is a connector that can be reduced in size.

REFERENCE SIGNS LIST

10: plate-shaped conductor, 10a: main body portion, 10b: through hole, 10c: notch portion, 12: end portion, 13: elastic portion, 14, 16: tongue-shaped portion, 20: housing, 21: projection, 22A, 22B: positioning portion, 21: projection, 23: groove portion, 24: projecting portion, 28: front wall, 31A, 32A, 33A, 34A, 35A, 31B, 32B, 33B, 34B, 35B:

conductive contact, 31*a*: connection portion, 40: connector main body, 42: distal end portion, 44: rear end portion, 50: casing (shell), 50A: main body portion, 50B: connecting portion, 50*a*: surface, 51: through hole, 52: inner wall, 53: protruding portion, 54: locking portion, 55: recess, 56: step portion, 58: abutting surface, 70: substrate, 71 to 77: terminal, 78: notch portion, 80: pen main body portion, 82: battery, 84: circuit portion, 86 to 88: cable, 100, 110: connector, 150: pen-type electronic device, 200: mating connector, 210: insertion portion.

The invention claimed is:
1. A connector comprising:
a connector main body comprising a conductive contact and a housing holding the conductive contact,
wherein the conductive contact is exposed from the housing so as to be electrically connectable to a mating connector at a distal end portion of the connector main body, and is exposed from the housing so as to be electrically connectable to a substrate at a rear end portion of the connector main body,
wherein the housing comprises two positioning portions that position the connector main body and the substrate relative to each other, and the two positioning portions being configured to position a first part of the substrate located between the two positioning portions, and
wherein the conductive contact is configured to form an electrical contact with a second part of the substrate located outside of the two positioning portions, the two positioning portions being located closer to a centerline of the connector main body than the conductive contact when the connector main body is viewed in plan, the center line extending along a direction from the distal end portion of the connector main body toward the rear end portion.
2. The connector according to claim 1, wherein the connector main body comprises a plate-shaped conductor which is different from the conductive contact, and
wherein the housing holds the conductive contact and the plate-shaped conductor so as to remain insulated from each other.
3. The connector according to claim 2, wherein each of the two positioning portions comprises a projection protruding in the direction beyond the conductive contact and the plate-shaped conductor.
4. The connector according to claim 3, wherein each of the two positioning portions positions the substrate by causing a notch portion of the substrate and a groove portion of the projection to be engaged with each other.
5. The connector according to claim 2, wherein the conductive contact is located along a front surface of the plate-shaped conductor, and
wherein a second conductive contact is located along a back surface of the plate-shaped conductor.
6. The connector according to claim 2, further comprising a shell comprising a through hole configured such that the mating connector is insertable,
wherein an end portion of the plate-shaped conductor exposed from the housing is fixed to an inner wall of the shell forming the through hole such that a distal end portion of the conductive contact is located in the through hole.
7. The connector according to claim 6, wherein the plate-shaped conductor comprises an elastic portion urging the end portion of the plate-shaped conductor toward the inner wall.

8. The connector according to claim 6,
wherein a step portion engageable with the end portion of the plate-shaped conductor is formed on the inner wall, and
wherein the end portion of the plate-shaped conductor is fixed to the inner wall by abutting against the step portion.
9. The connector according to claim 6, wherein the shell is made of metal and comprises an abutting surface against which a distal end of the mating connector abuts, when the mating connector is connected to the distal end portion of the connector main body.
10. The connector according to claim 5,
wherein the substrate is attached between the conductive contact located along the front surface and the second conductive contact located along the back surface.
11. A connector comprising:
a connector main body comprising an internal conductive contact, an external conductive contact and a housing holding the internal conductive contact and the external conductive contact,
wherein the internal conductive contact and the external conductive contact are exposed from the housing respectively so as to be electrically connectable to a mating connector at a distal end portion of the connector main body, and are exposed from the housing so as to be electrically connectable to a substrate at a rear end portion of the connector main body,
wherein the housing comprises a positioning portion that positions the connector main body and the substrate relative to each other, the positioning portion being located between the internal conductive contact and the external conductive contact, and
wherein the internal conductive contact and the external conductive contact are both configured to form an electrical contact with the substrate.
12. The connector according to claim 11, wherein the positioning portion comprises a projection protruding in a direction from the distal end portion of the connector main body toward the rear end portion, the projection protruding beyond the internal conductive contact, the external contact and the plate-shaped conductor.
13. The connector according to claim 12, wherein the positioning portion positions the substrate by causing a notch portion of the substrate and a groove portion of the projection to be engaged with each other.
14. The connector according to claim 11,
wherein the connector main body comprises a plate-shaped conductor which is different from the internal conductive contact and the external contact, and
wherein the housing holds the internal conductive contact, the external contact and the plate-shaped conductor so as to remain insulated from each other.
15. The connector according to claim 14,
wherein the internal conductive contact and the external conductive contact are located along a front surface of the plate-shaped conductor, and
wherein a second internal conductive contact and a second external conductive contact are located along a back surface of the plate-shaped conductor.
16. The connector according to claim 15,
wherein the substrate is attached between a first pair of conductive contacts and a second pair of conductive contacts, and
wherein the first pair of the conductive contacts includes the internal conductive contact and the external conductive contact located along the front surface, and the second pair of the conductive contacts includes the second internal conductive contact and the second external conductive contact located along the back surface.

17. The connector according to claim 14, further comprising a shell comprising a through hole configured such that the mating connector is insertable,
   wherein an end portion of the plate-shaped conductor exposed from the housing is fixed to an inner wall of the shell forming the through hole such that a distal end portion of the internal conductive contact and a distal end portion of the external conductive contact are both located in the through hole.

18. The connector according to claim 17, wherein the plate-shaped conductor comprises an elastic portion urging the end portion of the plate-shaped conductor toward the inner wall.

19. The connector according to claim 17,
   wherein a step portion engageable with the end portion of the plate-shaped conductor is formed on the inner wall, and
   wherein the end portion of the plate-shaped conductor is fixed to the inner wall by abutting against the step portion.

20. The connector according to claim 17, wherein the shell is made of metal and comprises an abutting surface against which a distal end of the mating connector abuts, when the mating connector is connected to the distal end portion of the connector main body.

* * * * *